US011023851B2

(12) United States Patent
Schoening

(10) Patent No.: US 11,023,851 B2
(45) Date of Patent: Jun. 1, 2021

(54) RFID-BASED INVENTORY TRACKING SYSTEM

(71) Applicant: A-1 PACKAGING SOLUTIONS, INC., St. Charles, IL (US)

(72) Inventor: Kenneth F. Schoening, St. Charles, IL (US)

(73) Assignee: A-1 PACKAGING SOLUTIONS, INC., St. Charles, IL (US)

( * ) Notice: Subject to any disclaimer, the term of this patent is extended or adjusted under 35 U.S.C. 154(b) by 0 days.

(21) Appl. No.: 16/370,742

(22) Filed: Mar. 29, 2019

(65) Prior Publication Data

US 2019/0303848 A1   Oct. 3, 2019

Related U.S. Application Data

(60) Provisional application No. 62/650,894, filed on Mar. 30, 2018.

(51) Int. Cl.
*G06Q 10/08* (2012.01)
*G06K 7/10* (2006.01)

(52) U.S. Cl.
CPC ....... *G06Q 10/087* (2013.01); *G06K 7/10336* (2013.01); *G06K 7/10386* (2013.01); *G06Q 10/0833* (2013.01)

(58) Field of Classification Search
CPC ............. G06Q 10/087; G06Q 10/0833; G06K 7/10336; G06K 7/10386
(Continued)

(56) References Cited

U.S. PATENT DOCUMENTS 5,832,814 A   11/1998  Nakatani
6,600,418 B2   7/2003  Francis et al.
(Continued)

FOREIGN PATENT DOCUMENTS

JP       2856242 B2    2/1999
JP     2008-006516    1/2008
(Continued)

OTHER PUBLICATIONS

Almaaitah et al., "3D Passive Tag Localization Schemes for Indoor RFID Applications," Exhibit 1015 of Consolidated Inter Partes Reviews IPR2014-01536 and IPR2015-00119 of U.S. Pat. No. 8,690,057.
(Continued)

*Primary Examiner* — Paultep Savusdiphol
(74) *Attorney, Agent, or Firm* — Marshall, Gerstein & Borun LLP

(57) ABSTRACT

An asset management and tracking system for use in a facility having a product designation RFID tag having product information is attached to a product and at least one location designation RFID tag having location information. The system includes a RFID reader and a portable communication device. The RFID reader reads at least one of the product designation RFID tag and the at least one location designation RFID tag and the portable communication device receives product information from and transmits product information to an asset tracking and management device. The RFID reader transmits product information read from the product designation RFID tag and the location information read from the location designation RFID tags to the portable communication device. The portable communication device, in turn, transmits the received product information and location information to the asset tracking
(Continued)

device and queries the asset tracking device for additional product and location information.

46 Claims, 15 Drawing Sheets

(58) Field of Classification Search
USPC .................................................. 235/375, 385
See application file for complete search history.

(56) References Cited

U.S. PATENT DOCUMENTS

| | | |
|---|---|---|
| 6,661,278 B1 | 12/2003 | Gilliland |
| 6,664,909 B1 | 12/2003 | Hyde et al. |
| 6,842,327 B1 | 1/2005 | Diorio et al. |
| 6,853,583 B2 | 2/2005 | Diorio et al. |
| 6,873,281 B1 | 3/2005 | Esterberg et al. |
| 6,909,389 B1 | 6/2005 | Hyde et al. |
| 6,943,678 B2 | 9/2005 | Muirhead |
| 6,950,342 B2 | 9/2005 | Lindhorst et al. |
| 6,954,159 B1 | 10/2005 | Cooper et al. |
| 6,958,646 B1 | 10/2005 | Colleran et al. |
| 6,965,142 B2 | 11/2005 | Diorio et al. |
| 6,977,527 B1 | 12/2005 | Hyde |
| 7,026,935 B2 | 4/2006 | Diorio et al. |
| 7,030,786 B2 | 4/2006 | Kaplan et al. |
| 7,038,544 B2 | 5/2006 | Diorio et al. |
| 7,038,603 B2 | 5/2006 | Diorio et al. |
| 7,042,701 B2 | 5/2006 | Diorio et al. |
| 7,049,872 B2 | 5/2006 | Diorio et al. |
| 7,049,964 B2 | 5/2006 | Hyde et al. |
| 7,061,324 B2 | 6/2006 | Diorio et al. |
| 7,071,507 B2 | 7/2006 | Diorio et al. |
| 7,102,438 B1 | 9/2006 | Colleran et al. |
| 7,107,022 B1 | 9/2006 | Thomas et al. |
| 7,116,240 B2 | 10/2006 | Hyde |
| 7,120,550 B2 | 10/2006 | Diorio et al. |
| 7,123,171 B2 | 10/2006 | Kaplan et al. |
| 7,145,203 B2 | 12/2006 | Wang |
| 7,145,370 B2 | 12/2006 | Bernard et al. |
| 7,149,118 B2 | 12/2006 | Diorio et al. |
| 7,177,182 B2 | 2/2007 | Diorio et al. |
| 7,183,926 B2 | 2/2007 | Diorio et al. |
| 7,187,237 B1 | 3/2007 | Diorio et al. |
| 7,187,290 B2 | 3/2007 | Hyde et al. |
| 7,199,663 B2 | 4/2007 | Diorio et al. |
| 7,212,446 B2 | 5/2007 | Diorio et al. |
| 7,215,251 B2 | 5/2007 | Hyde |
| 7,221,596 B2 | 5/2007 | Pesavento et al. |
| D543,976 S | 6/2007 | Oliver |
| 7,233,274 B1 | 6/2007 | Kuhn |
| D546,819 S | 7/2007 | Oliver |
| D546,820 S | 7/2007 | Oliver |
| D546,821 S | 7/2007 | Oliver |
| D546,822 S | 7/2007 | Oliver |
| D547,306 S | 7/2007 | Oliver |
| D547,754 S | 7/2007 | Oliver |
| 7,242,614 B2 | 7/2007 | Diorio et al. |
| 7,245,213 B1 | 7/2007 | Esterberg et al. |
| 7,246,751 B2 | 7/2007 | Diorio et al. |
| D548,225 S | 8/2007 | Oliver |
| 7,253,719 B2 | 8/2007 | Diorio et al. |
| 7,257,033 B2 | 8/2007 | Wang et al. |
| 7,262,092 B2 | 8/2007 | Diorio et al. |
| 7,263,001 B2 | 8/2007 | Wang et al. |
| 7,283,037 B2 | 10/2007 | Diorio et al. |
| 7,283,390 B2 | 10/2007 | Pesavento |
| 7,289,358 B2 | 10/2007 | Pesavento et al. |
| 7,304,579 B2 | 12/2007 | Diorio et al. |
| 7,307,528 B2 | 12/2007 | Glidden et al. |
| 7,307,534 B2 | 12/2007 | Pesavento |
| 7,312,622 B2 | 12/2007 | Hyde et al. |
| 7,315,067 B2 | 1/2008 | Wang |
| D562,810 S | 2/2008 | Oliver |
| D563,397 S | 3/2008 | Oliver |
| 7,375,398 B2 | 5/2008 | Wang et al. |
| 7,380,190 B2 | 5/2008 | Hara et al. |
| D570,337 S | 6/2008 | Oliver |
| 7,382,257 B2 | 6/2008 | Thomas et al. |
| 7,388,420 B2 | 6/2008 | Diorio et al. |
| 7,388,468 B2 | 6/2008 | Diorio et al. |
| 7,389,101 B2 | 6/2008 | Diorio et al. |
| 7,391,329 B2 | 6/2008 | Humes et al. |
| 7,394,324 B2 | 7/2008 | Diorio et al. |
| 7,400,255 B2 | 7/2008 | Horch |
| 7,403,122 B1 | 7/2008 | Koepp et al. |
| 7,405,659 B1 | 7/2008 | Hyde |
| 7,405,660 B2 | 7/2008 | Diorio et al. |
| D574,369 S | 8/2008 | Oliver |
| D574,370 S | 8/2008 | Oliver |
| 7,408,466 B2 | 8/2008 | Diorio et al. |
| 7,408,809 B2 | 8/2008 | Diorio et al. |
| 7,417,548 B2 | 8/2008 | Kavounas et al. |
| 7,419,096 B2 | 9/2008 | Esterberg et al. |
| 7,420,469 B1 | 9/2008 | Oliver |
| 7,423,539 B2 | 9/2008 | Hyde et al. |
| D578,114 S | 10/2008 | Oliver |
| 7,432,814 B2 | 10/2008 | Dietrich et al. |
| 7,436,308 B2 | 10/2008 | Sundstrom et al. |
| 7,448,547 B2 | 11/2008 | Esterberg |
| 7,472,835 B2 | 1/2009 | Diorio et al. |
| 7,482,251 B1 | 1/2009 | Paulsen et al. |
| D586,336 S | 2/2009 | Oliver |
| D587,691 S | 3/2009 | Oliver |
| 7,525,438 B2 | 4/2009 | Hyde et al. |
| D592,192 S | 5/2009 | Oliver |
| 7,528,724 B2 | 5/2009 | Horch |
| 7,528,728 B2 | 5/2009 | Oliver et al. |
| 7,541,843 B1 | 6/2009 | Hyde et al. |
| 7,557,714 B2 | 7/2009 | Roeder et al. |
| 7,561,866 B2 | 7/2009 | Oliver et al. |
| 7,592,897 B2 | 9/2009 | Diorio et al. |
| 7,616,120 B1 | 11/2009 | Humes et al. |
| D605,641 S | 12/2009 | Oliver |
| D606,056 S | 12/2009 | Oliver |
| D606,057 S | 12/2009 | Oliver |
| 7,633,376 B2 | 12/2009 | Diorio et al. |
| 7,633,377 B2 | 12/2009 | Sadr |
| 7,651,882 B1 | 1/2010 | Bockorick et al. |
| D610,576 S | 2/2010 | Oliver |
| 7,667,231 B2 | 2/2010 | Hyde et al. |
| 7,667,575 B2 | 2/2010 | Husak et al. |
| 7,667,589 B2 | 2/2010 | Desmons et al. |
| 7,667,652 B2 | 2/2010 | Gevargiz et al. |
| D611,037 S | 3/2010 | Oliver |
| D613,276 S | 4/2010 | Oliver |
| 7,696,882 B1 | 4/2010 | Rahimi et al. |
| D617,320 S | 6/2010 | Oliver |
| 7,733,227 B1 | 6/2010 | Pesavento et al. |
| D620,484 S | 7/2010 | Oliver |
| D620,928 S | 8/2010 | Oliver |
| 7,768,248 B1 | 8/2010 | Hyde |
| 7,768,406 B1 | 8/2010 | Peach et al. |
| 7,804,400 B2 | 9/2010 | Muirhead |
| 7,808,387 B1 | 10/2010 | Kuhn |
| 7,830,262 B1 | 11/2010 | Diorio et al. |
| 7,830,322 B1 | 11/2010 | Oliver et al. |
| 7,872,582 B1 | 1/2011 | Diorio |
| 7,873,326 B2 | 1/2011 | Sadr |
| 7,907,899 B1 | 3/2011 | Oliver |
| 7,917,088 B2 | 3/2011 | Hyde et al. |
| 7,920,046 B1 | 4/2011 | Aiouaz et al. |
| 7,969,286 B1 | 6/2011 | Hyde et al. |
| 7,970,484 B2 | 6/2011 | Fontanot |
| 7,973,643 B2 | 7/2011 | Hyde et al. |
| 7,973,645 B1 | 7/2011 | Moretti et al. |
| 7,978,005 B1 | 7/2011 | Hyde et al. |
| 7,982,611 B1 | 7/2011 | Picasso et al. |
| 7,990,249 B1 | 8/2011 | Hyde et al. |
| 7,999,675 B2 | 8/2011 | Diorio et al. |
| 8,044,774 B1 | 10/2011 | Diorio |
| 8,044,801 B1 | 10/2011 | Hyde et al. |
| 8,063,740 B1 | 11/2011 | Diorio et al. |
| 8,072,311 B2 | 12/2011 | Sadr et al. |

(56) References Cited

U.S. PATENT DOCUMENTS

| | | | |
|---|---|---|---|
| 8,072,327 B2 | 12/2011 | Enyedy et al. | |
| 8,072,329 B1 | 12/2011 | Srinivas et al. | |
| 8,077,013 B2 | 12/2011 | Cooper | |
| 8,082,556 B1 | 12/2011 | Aiouaz et al. | |
| 8,115,590 B1 | 2/2012 | Diorio et al. | |
| 8,115,597 B1 | 2/2012 | Oliver et al. | |
| 8,115,632 B1 | 2/2012 | Rahimi et al. | |
| 8,120,488 B2 | 2/2012 | Bloy | |
| 8,120,494 B1 | 2/2012 | Aiouaz et al. | |
| 8,134,451 B1 | 3/2012 | Diorio | |
| 8,154,385 B2 | 4/2012 | Aiouaz et al. | |
| 8,159,367 B2 | 4/2012 | Hofer et al. | |
| 8,174,367 B1 | 5/2012 | Diorio | |
| 8,174,369 B2 | 5/2012 | Jones et al. | |
| 8,188,927 B1 | 5/2012 | Koepp et al. | |
| 8,193,912 B1 | 6/2012 | Gutnik et al. | |
| 8,201,748 B2 | 6/2012 | Koepp et al. | |
| 8,224,610 B2 | 7/2012 | Diorio et al. | |
| 8,228,175 B1 | 7/2012 | Diorio et al. | |
| 8,237,562 B1 | 8/2012 | Picasso et al. | |
| 8,244,201 B2 | 8/2012 | Oliver et al. | |
| 8,258,918 B1 | 9/2012 | Diorio et al. | |
| 8,258,955 B1 | 9/2012 | Hyde et al. | |
| 8,260,241 B1 | 9/2012 | Hyde | |
| 8,279,045 B2 | 10/2012 | Diorio et al. | |
| 8,294,582 B1 | 10/2012 | Humes et al. | |
| 8,313,594 B2 | 11/2012 | Muirhead | |
| 8,325,014 B1 | 12/2012 | Sundstrom et al. | |
| 8,325,042 B1 | 12/2012 | Hyde et al. | |
| 8,326,256 B1 | 12/2012 | Kuhn | |
| 8,332,656 B2 | 12/2012 | Jones et al. | |
| 8,344,823 B2 | 1/2013 | Bloy et al. | |
| 8,344,857 B1 | 1/2013 | Oliver et al. | |
| 8,344,858 B2 | 1/2013 | Bloy | |
| 8,350,665 B1 | 1/2013 | Sundstrom et al. | |
| 8,354,917 B2 | 1/2013 | Diorio et al. | |
| 8,390,425 B1 | 3/2013 | Cooper et al. | |
| 8,390,430 B1 | 3/2013 | Sundstrom et al. | |
| 8,390,431 B1 | 3/2013 | Diorio | |
| 8,391,785 B2 | 3/2013 | Hyde et al. | |
| 8,395,482 B2 | 3/2013 | Sadr et al. | |
| 8,400,271 B2 | 3/2013 | Sadr | |
| 8,421,631 B2 | 4/2013 | Bloy et al. | |
| 8,427,315 B2 | 4/2013 | Aiouaz et al. | |
| 8,428,515 B1 | 4/2013 | Oliver | |
| 8,493,182 B2 | 7/2013 | Hofer et al. | |
| 8,690,057 B2 | 4/2014 | Schoening et al. | |
| 9,224,125 B2 | 12/2015 | Schoening et al. | |
| 9,317,823 B2 | 4/2016 | Muirhead | |
| 9,489,650 B2 | 11/2016 | Schoening et al. | |
| 2003/0182193 A1* | 9/2003 | Kawamata | G07G 1/0036 705/16 |
| 2003/0227392 A1* | 12/2003 | Ebert | H04L 67/12 340/8.1 |
| 2004/0102870 A1 | 5/2004 | Andersen et al. | |
| 2004/0225384 A1 | 11/2004 | Onishi et al. | |
| 2005/0021561 A1* | 1/2005 | Noonan | G06Q 30/06 |
| 2005/0192694 A1 | 9/2005 | Toyoshima et al. | |
| 2006/0038684 A1 | 2/2006 | Lahiri | |
| 2006/0200261 A1 | 9/2006 | Monette et al. | |
| 2007/0046439 A1 | 3/2007 | Takaku et al. | |
| 2007/0106574 A1 | 5/2007 | Kappel et al. | |
| 2007/0115137 A1 | 5/2007 | Lyon et al. | |
| 2008/0042838 A1 | 2/2008 | Levin et al. | |
| 2008/0068171 A1 | 3/2008 | Ehrman et al. | |
| 2008/0079935 A1 | 4/2008 | Vertoprakhov | |
| 2008/0136598 A1 | 6/2008 | Chen et al. | |
| 2008/0186139 A1 | 8/2008 | Butler et al. | |
| 2008/0223274 A1 | 9/2008 | Okuyama | |
| 2009/0032367 A1 | 2/2009 | Anthome | |
| 2009/0146816 A1 | 6/2009 | Patel et al. | |
| 2010/0030353 A1 | 2/2010 | Koishi et al. | |
| 2010/0207738 A1 | 8/2010 | Bloy | |
| 2010/0219953 A1 | 9/2010 | Bloy | |
| 2010/0225480 A1 | 9/2010 | Bloy et al. | |
| 2010/0310019 A1 | 12/2010 | Sadr | |
| 2011/0032079 A1 | 2/2011 | Bloy et al. | |
| 2011/0063113 A1 | 3/2011 | Hook et al. | |
| 2011/0068924 A1 | 3/2011 | Muirhead | |
| 2011/0090059 A1 | 4/2011 | Sadr | |
| 2011/0090061 A1 | 4/2011 | Hofer et al. | |
| 2011/0090062 A1 | 4/2011 | Hofer et al. | |
| 2011/0095087 A1 | 4/2011 | Master et al. | |
| 2011/0240731 A1* | 10/2011 | Lee | G06Q 30/06 235/375 |
| 2011/0254664 A1 | 10/2011 | Sadr et al. | |
| 2011/0279261 A1 | 11/2011 | Gauger et al. | |
| 2011/0282476 A1 | 11/2011 | Hegemier et al. | |
| 2012/0066019 A1 | 3/2012 | Hinshaw et al. | |
| 2012/0112913 A1 | 5/2012 | Bloy | |
| 2012/0139704 A1 | 6/2012 | Sadr et al. | |
| 2012/0188058 A1 | 7/2012 | Lee et al. | |
| 2012/0212331 A1 | 8/2012 | Jones et al. | |
| 2012/0229257 A1 | 9/2012 | Kim | |
| 2012/0257733 A1 | 10/2012 | Kosseifi et al. | |
| 2012/0275546 A1 | 11/2012 | Divsalar | |
| 2013/0049925 A1 | 2/2013 | Subramanian | |
| 2013/0093572 A1 | 4/2013 | Bloy et al. | |
| 2013/0099898 A1 | 4/2013 | Bloy | |
| 2013/0099901 A1 | 4/2013 | Jones et al. | |
| 2013/0233922 A1* | 9/2013 | Schoening | G06Q 10/0875 235/385 |
| 2014/0224870 A1* | 8/2014 | Schoening | G06Q 10/0875 235/376 |
| 2016/0078395 A1* | 3/2016 | Schoening | G06Q 10/087 705/7.15 |
| 2017/0053239 A1* | 2/2017 | Schoening | G06F 16/245 |
| 2018/0089474 A1* | 3/2018 | Ramon | B65G 1/137 |
| 2018/0162640 A1* | 6/2018 | Lee | B65G 1/1371 |

FOREIGN PATENT DOCUMENTS

| | | |
|---|---|---|
| KR | 10-2018-0132223 A | 12/2018 |
| WO | WO-2007/086808 A2 | 8/2007 |
| WO | WO-2007086808 A3 | 7/2008 |
| WO | WO-2009/035723 A1 | 3/2009 |

OTHER PUBLICATIONS

Decision Institution of Inter Partes Review, Case IPR2014-01536, U.S. Pat. No. 8,690,057 B2, entered Mar. 28, 2016.

Decision Institution of Inter Partes Review, Case IPR2014-01536, U.S. Pat. No. 8,690,057 B2, entered Mar. 30, 2015.

Decision Institution of Inter Partes Review, Case IPR2015-00119, U.S. Pat. No. 8,690,057 B2, entered Apr. 29, 2015.

European Search Report for Application No. 13757623.7, dated Sep. 2, 2015.

Hekimian-Williams et al., "Accurate Localizatoin of RFID Tags Using Phase Difference," Exhibit 1019 of Consolidated Inter Partes Reviews IPR2014-01536 and IPR2015-00119 of U.S. Pat. No. 8,690,057.

International Preliminary Report on Patentability for Application No. PCT/US2013/029408, dated Sep. 9, 2014.

International Search Report and Written Opinion for Application No. PCT/US2013/029408, dated Jun. 26, 2013.

Miesen, "Where is the Tag?" Ehixibit 1018 of Consolidated Inter Partes Reviews IPR2014-01536 and IPR2015-00119 of U.S. Pat. No. 8,690,057.

Nikitin et al., "Phase Based Spatial Identification of UHF RFID Tags," Intermec Technologies Corporation, Exhibit 1017 of of Consolidated Inter Partes Reviews IPR2014-01536 and IPR2015-00119 of U.S. Pat. No. 8,690,057.

Patent owner response to the Decision of Institution of Inter Partes Review for IPR2014-01536 and IPR2015-00119, filed Jun. 26, 2015.

Petition for Inter Partes Review of U.S. Pat. No. 8,690,057, dated Oct. 23, 2014.

Petition for Inter Partes Review of U.S. Pat. No. 8,690,057, dated Sep. 23, 2014.

(56) References Cited

OTHER PUBLICATIONS

Preliminary Response to Inter Partes Review No. IPR2014-01536, dated Jan. 7, 2015.
Preliminary Response to Inter Partes Review No. IPR2015-00119, dated Jan. 30, 2015.
Reply Brief for Inter Partes Review of U.S. Pat. No. 8,690,057 (IPR2014-01536), dated Sep. 28, 2015.
Siragusa et al., "RFID Tags Localization along an axis using a Tunable Near-Field Focused Circular-Phase Array Antenna," of Exhibit 1016 of Consolidated Inter Partes Reviews IPR2014-01536 and IPR2015-00119 of U.S. Pat. No. 8,690,057.
Song et al., "Spaceannotator: A High Precision Location Based Asset Management System in Indoor Environment," Proceedings of ICCTA2011, 1 NEC Labs China, Exhibit 1013 of Consolidated Inter Partes Reviews IPR2014-01536 and IPR2015-00119 of U.S. Pat. No. 8,690,057.
Stelzer et al., "Concept and Application of LPM—A Novel 3-D Local Position Measurement System," Exhibit 1020 of Consolidated Inter Partes Reviews IPR2014-01536 and IPR2015-00119 of U.S. Pat. No. 8,690,057.
Xiong et al., "Design and Implementation of a Passive UHF RFID-Based Real Time Location System," State Key Laboratory of ASIC & System, Fudan University, Exhibit 1014 of Consolidated Inter Partes Reviews IPR2014-01536 and IPR2015-00119 of U.S. Pat. No. 8,690,057.
U.S. Appl. No. 13/857,616, Nonfinal Office Action, dated Aug. 2, 2013.
U.S. Appl. No. 13/857,616, Notice of Allowance, dated Nov. 12, 2013.
U.S. Appl. No. 14/190,453, Nonfinal Office Action, dated Jun. 5, 2014.
U.S. Appl. No. 14/190,453, Nonfinal Office Action, dated Dec. 4, 2014.
U.S. Appl. No. 14/190,453, Final Office Action, dated Apr. 20, 2015.
U.S. Appl. No. 14/190,453, Notice of Allowance, dated Aug. 7, 2015.
U.S. Appl. No. 14/950,192, Nonfinal Office Action, dated Jan. 4, 2016.
U.S. Appl. No. 14/950,192, Notice of Allowance, dated Jul. 6, 2016.
First Office Action (Chinese only), Chinese patent application No. 201380012804.7, dated Aug. 3, 2016.
European Office Action for Application No. 13757623.7, dated Jan. 10, 2018.
European Office Action for Application No. 13757623.7, dated Jul. 5, 2018.
International Search Report and Written Opinion issued in PCT Patent Application Publication No. PCT/US2020/029308 dated Aug. 10, 2020.

* cited by examiner

RFID-BASED INVENTORY TRACKING SYSTEM

CROSS-REFERENCE TO RELATED APPLICATIONS

This application claims priority benefit of U.S. Provisional Application No. 62/650,894, filed Mar. 30, 2018, the disclosure of which is incorporated by reference in its entirety.

FIELD OF TECHNOLOGY

The present invention relates generally to inventory tracking and management systems and, more particularly, to an RFID-based inventory tracking and management system that may be used to manage the tracking of and shipping of products in a storage or warehouse environment.

DESCRIPTION OF THE RELATED ART

Storage facilities, such as warehouses, house numerous and various products until those products are needed in a manufacturing process, need to be shipped to a customer, etc. Products in storage facilities may sit in the storage facilities for varying amounts of time depending on the need for those products or the shelf life of the product. Once a product is needed, a storage facility worker must generally either manually locate the product, or look up where the particular product was placed when it was first stored, using a computer or some other device. The worker may then use a delivery or transport vehicle to pick up the particular product and drop off the particular product at a desired location within the storage facility, such as on a manufacturing line, a truck for delivery, at a loading bay, etc.

Often, however, the products housed in storage facilities are shuffled and moved around in order to accommodate other products, for cleaning purposes, or for any other reason that may necessitate moving a product from one location to another. It is possible that, during relocation of the product, two products become swapped or that a product is misplaced or "lost" within the warehouse. The inadvertent misplacement of a particular product often goes undocumented because the misplacement of the product happens without the knowledge of the storage facility worker or simply due to human error. Moreover, storage facility workers may inadvertently take the wrong product and place it on a truck for delivery. Many factors may contribute to such errors, such as mislabeled products, unclear marking of storage areas, relocated products whose new location was not updated in an inventory management system, or simply human error. Therefore, manually tracking and continuously updating the location of products as they are moved within a storage facility becomes a tedious and time-consuming task that is error prone. Such errors lead to incorrect products, or out of date products, being used during manufacturing and/or being shipped to customers and the inability to locate products resulting in shipping delays, costing money to the storage facility and potentially hazardous situations in the case of food products, pharmaceuticals, etc.

SUMMARY

An inventory tracking and management system includes a radio frequency identification ("RFID") reader, in communication with antennas, disposed on a forklift (or other product transportation vehicles), wireless communication devices such as wireless routers and gateways disposed on the forklift, a user interface device located on the forklift, wireless communication nodes disposed at various locations within a storage and shipping environment having bays, shelves, racks, etc., each of which include various bays therein, a detection system disposed on the front of the forklift, and a centralized asset tracking and management device having a product and order database and a tracking and communication application. The user interface device includes a remote tracking and communication application that executes on a processor and communicates with the centralized asset tracking and management device, the RFID reader, and the wireless communication node or device on the forklift to perform various tasks. Additionally, the user interface device may include a display or interface screen to visually present information to the forklift operator or other user.

Moreover, the inventory tracking and management system includes various location designation RFID tags disposed around the storage and shipping environment with each of the location designation RFID tags having a known and unique identification number associated therewith. Some of the location designation RFID tags may be, for example, disposed at shipping portals or loading bays, while other location designation RFID tags may be disposed on a pole or support structure at the entrance or start of each bay. Further, a product designation RFID tag is located on each product in the storage and shipping environment. Each of the location designation RFID tags and the product designation RFID tags has a unique ID associated therewith and these IDs are known by the centralized asset tracking and management device, so that the centralized asset tracking and management device can associate some of the particular location designation RFID tags with a particular bay or rack, can associate some of the particular location designation RFID tags with a particular shipping portal or loading bay, and can associate reach of the product designation RFID tags with a particular product.

Generally speaking, the centralized asset tracking and management device includes a centralized tracking and communication application that is stored in a memory of and executed on a processor of the centralized asset tracking and management device. The centralized tracking and communication application is communicatively connected to one of the wireless communication nodes or gateways and is so connected to the wireless communication network within the facility. The centralized tracking and communication application operates to communicate with the user interface devices and the RFID tag readers to obtain information from and to provide information to the user interface devices and, additionally, operates to track and manage the movement of the various different products between the bays, shelves and racks, and the shipping portals or loading bays.

In use, the centralized tracking and communication application may send a signal to the user interface device, the signal containing information regarding a product that needs to be, either, moved from a particular bay in a shelf, or rack, to another bay in a shelf, or rack, (or a different shelf) or moved from a particular bay in a shelf, or rack, to a shipping portal or loading bay and onto a truck to be delivered to a client or another facility/location. The user interface device visually displays the information sent by the centralized tracking and communication application, which may include, for example, the product code, where the product is located, and the destination of the product. A forklift operator then drives the forklift to the proper shelf, rack, or bay and picks up the product from the desired shelf, rack, or bay.

Once the desired product is held by the forklift, the detection system detects that a product has been picked up and turns on the RFID reader, which then turns on at least one front facing antenna to read or ping the product designation RFID tag disposed on the product held by the forklift all while the forklift operator backs out of the particular bay of the shelf where the product was located into, for example, the space between two shelves. When the forklift is parallel to the shelf from which the product was picked up, or, for example, five (5) to eight (8) feet away from the shelf, the RFID reader and front facing antenna lock onto the product designation RFID tag that is carried by the forklift. The user interface device may visually display, to the forklift operator or other user, that the RFID reader and the antenna have locked on to the product. The remote tracking and communication application of the user interface device queries the centralized tracking and communication application, which compares the product and product designation RFID tag ID sent by the remote tracking and communication application with the product and product designation RFID tag stored in a product and order database, which is stored on the centralized asset tracking and management device. If the centralized tracking and communication application determines that the information matches, then the centralized tracking and communication application may send a signal to the user interface device, which visually and audibly alerts the forklift driver (e.g., by displaying a green notification box) that he or she has picked up the correct product for the order the forklift operator is fulfilling. If, for example, the centralized tracking and communication application determines that the information does not match, then the centralized tracking and communication application sends a signal to the user interface device, which visually alerts the forklift operator (e.g., by displaying a red notification box and another type of audible alarm) that the operator has picked up the incorrect product for the order the forklift driver is filling. Once the correct product is carried by the forklift, the forklift operator may proceed to the required destination of the product (e.g., another bay of a shelf or a shipping portal or loading bay and onto a truck).

Once near the manufacturing lines, shipping portal, or loading bay, the RFID reader may selectively turn on the front facing antenna (if not already on) to read or detect location designation RFID tags disposed at manufacturing lines, shipping portals, or loading bays. As the forklift nears a location designation RFID tag disposed at the manufacturing lines, shipping portals, or loading bays, the RFID reader and the front facing antenna send the particular location designation RFID tag ID of the location designation RFID tag that the RFID reader and the front facing antenna read or detect. Similar to the process described in relation to when a product is picked up, the centralized tracking and communication application compares the sent location designation RFID tag ID and product designation RFID tag ID with the information stored in the product and order database for the particular order that the forklift operating is fulfilling. If, for example, the centralized tracking and communication application compares the sent information and the information stored in the product and order database and determines that the sent information and the information stored in the product and order database match, then the centralized tracking and communication application sends a signal to the user interface device, which visually alerts the forklift driver (e.g., by visually displaying a green notification box and audible alarm) that the operator has selected the correct shipping portal or loading bay for the order the forklift operator is fulfilling. If, for example, the centralized tracking and communication application compares the sent information and the information stored in the product and order database and determines that the sent information and the information stored in the product and order database do not match, then the centralized tracking and communication application sends a signal to the user interface device, which visually alerts the forklift operator (e.g., by displaying a red notification box and audible alarm) that he or she has delivered the product to the incorrect loading bay for the order the forklift driver is fulfilling. In such an example, the forklift operator may then try a different manufacturing line, shipping portal, or loading bay and the above process will repeat until the correct shipping portal or loading bay is located.

Furthermore, as the desired product is placed in the correct manufacturing line, shipping port, or loading bay and subsequently on a truck, the detection system and the user interface device may detect that the product has been dropped off and the remote tracking and communication application of the user interface device may send a signal, which includes, for example, the last known location of the product, to the centralized tracking and communication application, which is then stored to the product and order database as being the current location of the product. Once the information is stored, the centralized tracking and communication application may send the user interface device a signal to visually indicate to the forklift operator (e.g., by displaying a yellow, or purple, notification box on the display of the user interface device and emitting an audible alarm via a speaker of the user interface device) that he or she has successfully dropped off the product. The forklift operator may continue to pick up and drop off products until the order has been filled all while the above discussed processes take place with each newly picked up and dropped off product. Once the order has been filled, the user interface device receives an input that the order has been filled and the remote tracking and communication application sends a single to the centralized tracking and communication application, which then queries the product and order database to update the order as completed.

BRIEF DESCRIPTION OF THE DRAWINGS

FIG. 19 is an example display screen of a user interface device of a general overview of outstanding orders.

FIG. 20 is an example display screen of a user interface device that may be used to enter or view sales or order information.

DETAILED DESCRIPTION

Figure 1:
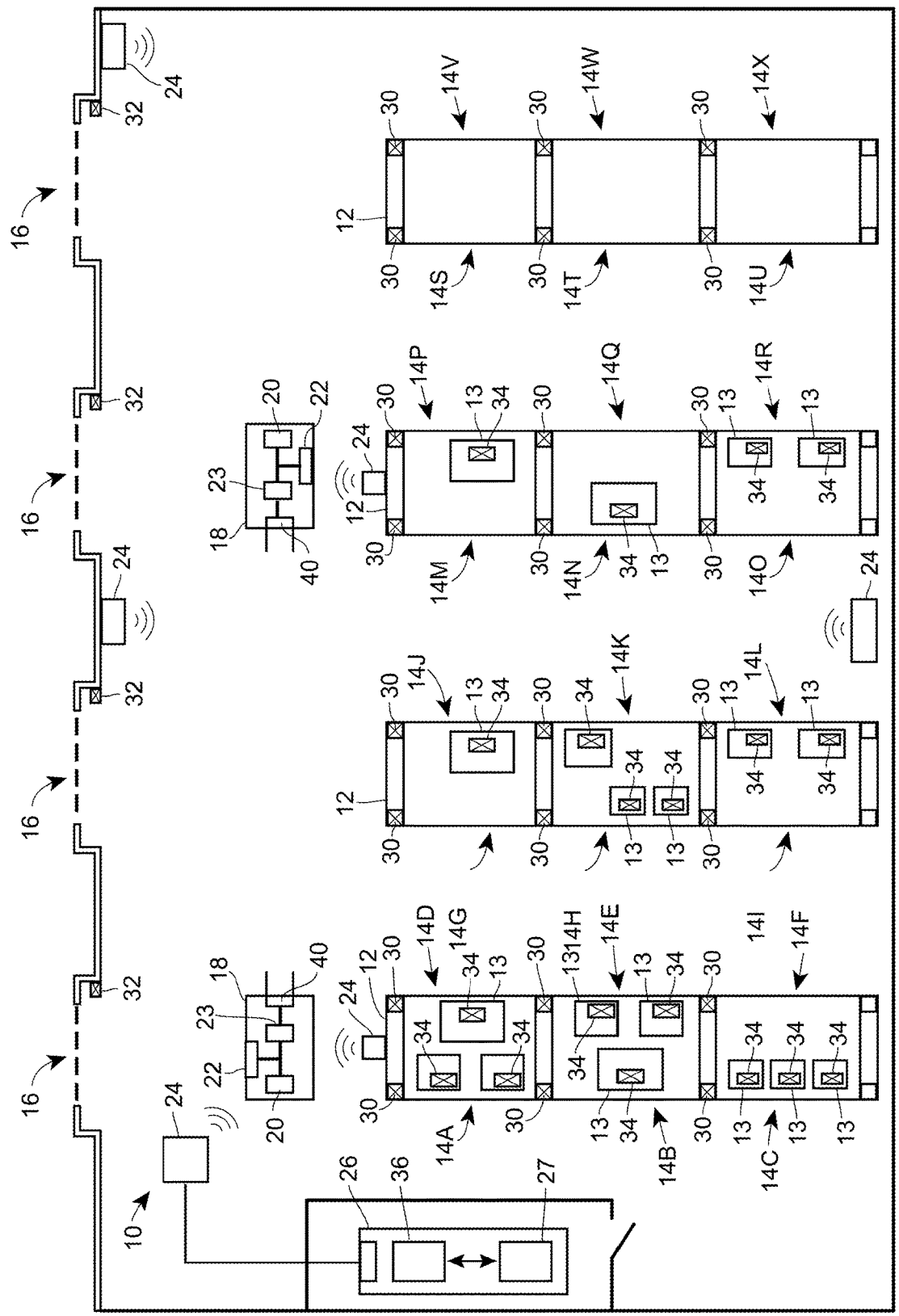
FIG. 1 is a top view of an example, storage and shipping environment in which an RFID-based inventory tracking system is located.

FIG. 1 depicts a top plan view of an example storage and shipping environment 10 (e.g., a warehouse, storage facility) in which an RFID-based inventory tracking system is disposed. The RFID-based inventory tracking system may be used to track the location of various different products, such as pallets of material, raw materials, rolls of material, etc., as these products are introduced into, stored in, produced in, and moved around within the environment 10, and as these products are taken from the storage and shipping environment 10 and placed onto one or more trucks or other delivery vehicles for delivery to a customer, for example.

As illustrated in FIG. 1, the storage and shipping environment 10 includes a series of storage shelves 12, upon which various different products 13 may be stored for a period of time before being used in a manufacturing process or being shipped to a customer. Each of the shelves 12 includes various bays 14 therein, which indicate portions of the shelves 12. As is typical in a warehouse environment, each bay 14 (labeled as bays 14A-14X in FIG. 1) may be labeled with or designated with a unique identifier number within the context of the storage environment 10. Each shelf 12 may be double-sided, for example, so that there is a bay 14 on either side of each shelf 12. Likewise, the storage and shipping environment 10 includes a series of shipping portals or loading bays 16 that may be, for example, associated with loading bays at which trucks park to drop off or accept delivery of the products 13 within the environment 10. Still further, the storage and shipping environment 10 includes various movable devices or forklifts 18 (or other delivery vehicles) which are used to place various ones of the products 13 on the shelves 12 in various ones of the bays 14 for storage; to move products 13 around within the shelves 12 if desired; to take products off the shelves 12 and deliver those products to one of the loading bays 16 to be placed on a truck or other delivery vehicle, etc. Likewise, the forklifts 18 may pick up new products or materials from the loading bays 16 (or from trucks at the loading bays 16) and place the new products or materials at any of the various bays 14 of the shelves 12 for storage and later use.

As is known, in a busy and large storage facility, it is difficult to track the locations at which various different materials or products 13 are placed in a manner that makes it easy to find those products when needed, such as when needed in a manufacturing process, when these products need to be shipped to a customer, etc., and difficult to ensure the busy and large storage facility is using the first in, first out ("FIFO") inventory method. An RFID-based tracking system as described herein can be used to enable automatic recognition of, and tracking of the various products 13 as they are placed in various bays 14A-14X of the shelves 12, as these products 13 are moved between different bays 14A-14X of the shelves 12, and as these products 13 are loaded onto delivery trucks at the loading bays 16.

In particular, an RFID-based tracking system includes an RFID reader 20, disposed on each of the forklifts 18 (or other product transportation vehicles), wireless communication devices such as wireless routers and gateways 22 disposed on the forklifts 18, user interface devices 23 located on the forklifts 18, wireless communication nodes 24 disposed at various locations within the environment 10, and a centralized asset tracking and management device 26 (having a product and order database 27 and a centralized asset tracking and management application 36), as well as a display or interface screen 28 that communicates with the wireless communication nodes or gateways 24.

Figure 2:
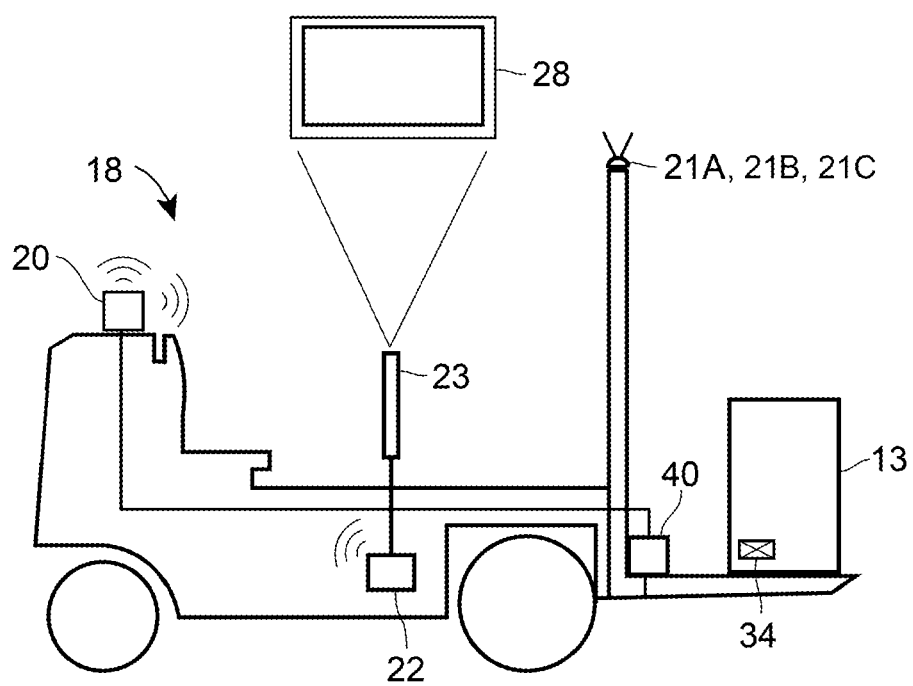
FIG. 2 is a diagram of a fork lift having various RFID tracking system components installed thereon.

FIG. 2 illustrates a single forklift 18 having an RFID reader 20 disposed thereon, typically at an upper location thereof such as on the top of the forklift 18 and disposed to be able to read RFID tags that are disposed near the forklift 18, such as on walls, shelves, etc. and on products that may be disposed on the tongs of the forklift 18. While a forklift 18 has been illustrated in FIG. 2, the RFID reader 20, and any additional equipment, may be placed on any movable device, such as, for example, a product transportation vehicle (e.g., a forklift). In particular, the RFID reader 20 may be attached to a plate on a first side of the plate, which includes a magnet disposed on a second side of the plate. In such an example, the plate can be used to releasably attach the RFID reader 20 to the forklift 18 or other surfaces capable to interacting with the magnet. The magnet can be any magnet strong enough to attach the RFID reader 20 to a magnetic surface, such as, for example, a rare earth magnet. Additionally, multiple antennas 21, in communication with the RFID reader 20, may be disposed on the forklift 18 for detecting and reading RFID tags. The antennas 21 may be placed around the forklift 18 to minimize interference with the operation of the forklift 18 and to ease maintenance should the antennas 21 need to be replaced. In particular, for example, multiple front facing antennas 21A, 21B, 21C are placed toward the front end of the forklift 18 (i.e., towards the tongs of the forklift 18) to detect and read an RFID tag placed on a product 13, to detect and read an RFID tag placed on the storage shelf 12 and the bays 14, to detect and read an RFID tag placed near a loading bay 16, and to detect and read an RFID tag placed on a floor of the environment 10 near storage shelf 12, the bays 14, and the loading bay 16. In some examples, a plurality of antennas can be placed towards the rear end of the forklift 18 (i.e., the side opposite the tongs of the forklift 18) to detect and read one or more RFID tags placed on the storage shelf 12 and the bays 14. Further, each of the multiple antennas 21 may be coded to detect and selectively read only RFID tags placed on products 13 and near the loading bays 16 or only RFID tags placed on the storage shelf 12 and the bays 14. For example, the front facing antenna 21A can be coded to read only RFID tags disposed on products 12 and near the loading bays 16, and the front facing antennas 21B, 21C can be coded to detect and read only RFID tags placed on the storage shelf 12 and the bays 14. The antennas 21 also may have a detection radius of, for example, four (4) feet. As a result of the detection radius of the antennas 21, the front facing antenna 21A and the plurality of rear facing antennas 21B, 21C may be selectively turned on by, or used by, the RFID reader 20 to limit the amount of RFID tags that are being read by the RFID reader 20 when the forklift 18 is around many products 13 or between shelves 12 or bays 14 of the shelves 12. Thus, the multiple antennas 21 help determine the position of the forklift 18 in the environment 10 and, in turn, the location of the product 13. Further, the antennas 21A, 21B, and 21C may be oriented in different directions to read RFID tags placed on various surfaces (e.g., shelves, bays, loading bays, flood, ceiling, etc.). For example, the front facing antenna 21A can be oriented to point straight ahead of the forklift 18, the front facing antenna 21B can be oriented to point above the forklift 18, and the front facing antenna 21C can be oriented to point below the forklift 18. It will be appreciated that the antennas 21A, 21B, and 21C may also be oriented to point to the left and right of the forklift 18. FIG. 2 also illustrates that the forklift 18 includes a network communication device, or a wireless communication device 22, which communicates with wireless nodes or gateway devices 24 (FIG. 1) to perform wireless communications. Moreover, a portable communication device, or user interface device 23, is typically disposed on the forklift 18 in a position that is viewable and accessible by the forklift operator. In particular, the user interface device 23 may be positioned, for example, to the right side of the forklift operator. Generally speaking, the user interface device 23 may be a standalone computing device, such as a laptop, a tablet device, a phone or other handheld device, etc., but this user interface device 23 could be incorporated into the forklift 18, if so desired. The user interface device 23 includes a remote tracking and communication application that executes on a processor and that will be used, as described herein, in more detail, to communicate with the asset tracking and management device 26, the RFID reader 20, and the wireless communication node or device 22 on the forklift 18 to perform various tasks. The user interface device 23 may also include a display or interface screen 28, illustrated in an expanded display in FIG. 2, that may be used to visually present information to the forklift operator or other user, and may include a speaker or other audible device that may be used to provide sounds, alarms, etc. to the forklift operator or other user and an operator input device, such as a touch screen, a keyboard, etc., that may be used to accept inputs from the forklift operator or other user. As also illustrated in FIG. 2, the user interface device 23 is communicatively coupled to the RFID reader 20 and to the wireless communication device 22.

Referring back to FIG. 1, the wireless communication nodes or gateways 24 may be located at various locations within the environment 10, such as on the shelves 12, hanging from the ceiling, disposed near the loading bays 16, etc., or may be located in any other positions that provide wireless communication coverage in any known manner throughout the area covered by the environment 10 (and particularly the area traversed by the forklifts 18). The wireless communication devices 22 and 24 may communicate using any desired wireless communications standard, such as an 802.11 protocol, a TCP/IP protocol, a Bluetooth protocol, any Wi-Fi protocol, etc.

Various location designation RFID tags 30 and 32 are disposed around the environment 10 to indicate various different locations within the environment 10. Each of the tags 30 and 32 may have a known and unique identification number associated therewith, such that the antennas 21A, 21B, 21C disposed on the forklift 18 can identify the various location designation RFID tags 30, 32 disposed within the environment 10. In the example of FIG. 1, a different location designation RFID tag 30 is illustrated as being disposed at each of the bays 14A-14X, such as on a pole, support structure, or the floor at the entrance or start of each bay 14, while a different location designation RFID tag 32 is located at or near each of the loading bays 16 in a fixed location such as, for example, a wall near the loading bays 16 of the floor near the loading bays 16. The various location designation RFID tags 30 and 32 may be releasably attached to the previously mentioned example locations, so that the location designation RFID tags 30 and 32 may be moved to a different location if warehouse layout is reorganized. Still further, a product designation RFID tag 34 is located on each product 13. Products 13 may be, for example, any type of product or material and or any group of product or material, such as individual rolls of paper or other products, pallets of similar materials, boxes of materials or components, etc. The product designation RFID tags 34 may be releasably attached to products 13 so that these tags may be later used on different products 13. How the product designation RFID tag 34 is releasably attached to the product 13 depends on the product, but may, for example, be achieved using an adhesive, a clip, a magnet, a sticker, etc. Importantly, each of the RFID tags 30, 32, and 34 has a different and unique ID associated therewith and these IDs are known by the asset tracking and management device 26, so that the asset tracking and management device 26 can associate each of the particular location designation RFID tags 30 with a particular bay 14, can associate each of the particular location designation RFID tags 32 with a loading bay 16, and can associate each of the particular product designation RFID tags 34 with a particular product 13.

Generally speaking, the centralized asset tracking and management device 26, which may be a user workstation, a server, or any other type of computing device, may be located in a different room or in a less harsh environment than the shipping or warehouse floor. The asset tracking and management device 26 includes a centralized tracking and management application 36 that is stored in a memory of and executed on a processor of the device 26. The tracking application 36 is communicatively connected to one of the nodes 24 (via a wired or a wireless connection and a communication interface of the device 26) and so is connected to the wireless communication network within the facility 10. The tracking application 36 operates to communicate with the user interface devices 23 and the RFID tag readers 20 to obtain information from and to provide information to the user interface devices 23 and additionally operates to track and manage the movement of the various different products 13 between the shelves 12 and the loading bays 16.

More particularly, the tracking application 36 stores information regarding the RFID tags 30 and 32 identifying particular bays 14 of each shelf 12 and identifying particular loading bays 16 in the product and order database 27 of the device 26. Likewise, the tracking application 36 stores information for each of the RFID tags 34 associated with each product 13, such as the product name, type, quantity, etc. of the product. The tracking application 36 may further create, store, and use a list of orders, order numbers, or job numbers identifying various jobs or shipping orders that are to be placed or executed within the environment 10 including any details of the order or job. In particular, each order may include a list of one or more products 13 that needs to be shipped to a particular customer, that needs to be moved from one location in the facility 10 to another location in the facility 10, or that are to be received from a customer or supplier and placed on a storage shelf 12 for storage in some manner. Each such job or order number includes a specific product or group of products and, if desired, may include the RFID tag or ID numbers for the RFID tags 34 that are on those products 13. Thus, when a product 13 arrives via the loading bays 16 or otherwise, a unique RFID tag 34 is placed on the product 13 and that unique ID is then stored in the product and order database 27 of the tracking application 26 as being associated with that product 13 and potentially with an order. If no order yet exists, when an order is made, the tracking application 36 will select a particular product 13 and its corresponding RFID tag 34 to be associated with the order.

Additionally, each order may include a customer to whom the product 13 was shipped, an address for the customer or other customer or shipping information, such as the time or day of the shipment, the truck that was used to perform the shipping, a driver name of the truck, the loading bay 16 of the truck for the shipment or order, etc. Of course, order information such as the truck number, driver of the truck, etc., can be filled out when that information is available such as when an order is placed or when an order is actually being shipped or fulfilled. Further, as each order is being fulfilled, the tracking application 36 may store, on a memory of the centralized asset tracking and management device 26, real time information regarding the progress of each order, such as, for example, temporal and quantity information regarding each particular order. In particular, the tracking application 36 may store when a particular product that is part of an order, is loaded onto a trailer truck waiting in a particular loading bay through a time-stamp.

Importantly, as illustrated best in FIG. 2, each of the forklifts 18 includes a sensor based detection device 40 (which may be, for example, a laser-based detection device, an optical detection device, etc.) disposed on the front of the forklift 18 and positioned to detect the existence of a product 13 loaded on the forklift 18, i.e., loaded on or positioned on the lift or tongs of the forklift 18, and to detect the existence of a product 13 disposed near the forklift 18, i.e., near the lift or tongs of the forklift 18 that has not been loaded on the lift or tongs of the forklift. If the detection device 40 is a laser based detection device, the detection device 40 may have a laser transmitter that directs a laser beam toward the product 13 on the forklift 18 and a detector that detects reflected light from the product 13. The detection device 40 may detect the presence of a product 13 on or near the forklift 18 via a sensor that senses the reflection. When no product 13 is on or near the forklift 18, the laser beam does not reflect off of any product close to the detection device 40 and thus gets sent out into space where the beam is diffused enough, that if it reflects back, it does not reflect back in a manner that would indicate to the detection device 40 that a product is on or near the forklift 18. However, if a product 13 is on or near the forklift 18, the light reflects back at a high enough magnitude to be sensed by the detection device 40, which then determines that a product 13 is on or near the front of the forklift 18. However, other types of sensors besides lasers could be used in or for the detection device 40 including, for example, weight sensors on the forklift 18, electromagnetic sensors that use other wavelengths of electromagnetic energy to detect the presence of product on or near the forklift 18, sonic detectors, optical detection devices, etc. Further, the detection device 40 may be placed in a location on the front of the forklift 18 that minimizes the possibility of damage due to shifting or sliding products 13 that are picked up by the forklift 18. The detection device 40 may also be covered to minimize impact damage from products picked up by the forklift 18. As illustrated in FIG. 2, the detection device 40 is communicatively coupled to the user interface device 23 on the forklift 18 and communicates signals indicative of the existence or non-existence of a product 13 on the tongs or lift of the forklift 18. When the detection device 40 indicates that a product 13 is present on the forklift 18, or near the forklift 18, the detection device 40 then turns on the RFID reader 20. The RFID reader 20 then turns on the antennas 21A, 21B, 21C and then reads the product designation RFID tag 34 disposed on the product 13 that is on the tongs or lift of the forklift 18, or near the front of the forklift 18. After the RFID reader 20 reads the product designation RFID tag 34, the RFID reader 20 queries the tracking application 36 via the communication network using the communication devices 22 and 24. Once queried, the tracking application 36 analyzes the product designation RFID tag 34 information sent relative to the data stored in the product and order database 27 to determine if the forklift operator picked up the correct product 13. The user interface device 23 may then visually and audibly alert the forklift operator that he or she picked up the correct product 13, using, for example, a green alert and a first audible alert, or that he or she picked up the incorrect product 13 using, for example a red alert and a second audible alert. FIGS. 6, 9, 10, and 14-16 depict an example display 50 produced by the user interface device 23 to indicate to the forklift operator that he or she picked up the correct product 13 or that he or she picked up the incorrect product 13. FIGS. 6, 9, 10, and 14-16 will be explained in greater detail later.

While the RFID-based inventory tracking system has been described as using the detection device 40 to detect a product 13 disposed at or near the forklift 18 and, in response, turning on the RFID reader 20 to read the product designation RFID tag 34, the RFID-based inventory tracking system does not require use of the detection device 40. For example, in one exemplary aspect of the system, the RFID-reader 20 can be in an activated, or on state, constantly while the forklift 18 is in use. In a second exemplary aspect of the system, the RFID-reader 20 can be selectively turned on by a forklift operator. For example, the forklift operator can interact with the interface screen 28 of the user interface device 23 (e.g., by touching, pressing, swiping, clicking, etc. the interface screen 28) after a product 13 is on the tongs of the forklift 18 or when a product 13 is near the forklift 18. Further, in such an example, the forklift operator can selectively turn off the RFID-reader 20 by interacting with the interface screen 28 of the user interface device 23 (e.g., by touching, pressing, swiping, clicking, etc. the interface screen 28) once the RFID-reader 20 identified the product 13 being transported or near the forklift 18.

The inventory tracking system operates so that, when a product is first introduced into the environment 10, the product 13 is provided with a product designation RFID tag 34. The tag ID and description, or other details, of the product 13 are stored in the asset tracking and management device 26 and in particular in the product and order database 27 in some manner by the tracking application 36. For example, an inventory manager may input this information in response to the arrival of a new product 13. The input process will be described in greater detail with respect to FIGS. 20-22 later. In some cases, the system 26 may accept a description of or other identification of a product 13, and may store this information in the product and order database 27. Then, when the product 13 arrives in the environment 10, warehouse personnel may use a user interface device 23 (which may or may not be on a forklift 18) to indicate to the tracking application 36 what product has arrived and the tracking application 36 may store or find the product 13 in the product and order database 27 of the asset tracking and management device 26. The tracking application 36 may then instruct the person, via the user interface device 23, to place an RFID tag on the product 13 and to scan that RFID tag using an RFID reader 20 (or a handheld reader if so desired). The RFID reader 20 may then communicate with the system (e.g., via a user interface device 23 which may or may not be on a forklift 18) to indicate the RFID tag number or ID for the product designation RFID tag 34 placed on the product 13. The tracking application 36 then stores that RFID tag number or ID for that product in the product database 27.

As a result, each product 13 has its own unique product designation RFID tag 34, and that product designation RFID tag 34 may be used to track the location of that product 13 within the storage environment 10. In particular, when a forklift 18 picks up a product 13, for example, at the loading bay 16, the laser or other detection device 40 detects that a product 13 is currently disposed on the forklift 18 (e.g., is resting on the tongs or lift of the forklift 18) and signals this pick-up event to the RFID reader 20. At this time, the laser detection device 40 instructs the RFID reader 20 on the forklift 18 to turn on. The RFID reader 20 then turns on the multiple antennas 21A, 21B, 21C and pings or reads the RFID tag ID associated with the product designation RFID tag 34 on the product 13 that is on the forklift 18. The RFID reader 20 sends this RFID tag ID to the user interface device 23 and in particular to the remote tracking application of the user interface device 23, which may then query the tracking application 36 via the wireless network devices 22 and 24, which communicates with the asset tracking and management device 26 and the product and order database 27 to determine what product 13 the forklift operator picked up and where the product 13 needs to go or to determine whether the forklift operated picked up the correct product 13. In this manner, the detection device 40, the RFID reader 20, and the user interface device 23 detect and inform the tracking application 36 that the product 13 with a particular RFID tag 34 is now on the forklift 18.

As the forklift 18 moves throughout the environment 10, the RFID reader 20, through the use of the antennas 21A, 21B, 21C, also detects the current location of the of the forklift 18 by observing or detecting the closest or nearest location designation RFID tag 30 or 32 associated with one of the shelves 12 or associated with one of the loading bays 16, so long as the forklift 18 has a product 13. If the forklift operator does not have the product 13 on the forklift 18, the RFID reader 20 and the antennas 21A-C may remained turned off because it is not necessary to have the RFID reader 20 and antennas 21A-C reading RFID tags 30, 32, and 34 when there is no product 13 on the forklift 18. The RFID tag reader 20 may provide or store the last detected or closest location designation RFID tag as the one with the highest return signal therefrom, but need not communicate this information to the asset tracking and management device 26 until a drop-off action occurs. More particularly, as the forklift operator drives the forklift 18 to a particular bay 14 of one of the shelves 12, the RFID reader 20 in communication with the antennas 21A-C (e.g., antennas 21B, 21C) of the forklift 18 determines the ID of the RFID tag 30 associated with that bay 14 as being the last detected or closest tag 30. The forklift operator may then place the product 13 on one of the shelves 12 in the bay 14 and back away from the product 13, thereby removing the product 13 from the forklift tongs and causing the detection of a drop-off event. That is, at this point, the detection device 40 and the user interface device 23 recognizes that the product 13 has been dropped off of or has been removed from the tongs of the forklift 18 (a drop-off event) and may register that information with the central tracking system 26, along with the current location of the forklift 18 as specified by the last detected location designation RFID tag 30. In particular, the RFID reader 20 or the user interface device 23 sends the last detected location designation RFID tag ID to the tracking application 36, which will register the product 13 having the product designation RFID tag 34 at that location (e.g., at the bay 14 having the last detected location designation RFID tag 30). As a result, the centralized tracking computer 26 knows, via this communication and detection circuitry, which bay 14 of which shelf 12 upon which a particular product 13 with a particular RFID tag 34 has been placed. The tracking application 36 then stores this information in the product database 27 as being the current location of the product 13. However, in some exemplary aspects, the forklift 18 may not be equipped with a detection device 40 and, as such, a drop off event cannot be detected by the system. In such an example, the forklift operator can interact with the interface screen 28 of the user interface device 23 by, for example, touching, pressing, swiping, clicking, the interface screen 28 to indicate to the system that a drop off event has occurred. In other examples, the RFID reader 20 can indicate to the user interface device 23 that the RFID reader is no longer locked onto a product 13 and, thus, signal a drop off event to the user interface device 23.

Likewise when a forklift 18 is used to obtain one of the products 13 off of a shelf 12 and to move the product 13 to a different shelf 12, the same detection and tracking actions take place. That is, when the forklift 18 arrives at a particular shelf 12, the forklift 18 picks up a product 13 off the shelf 12 by placing the product 13 on the tongs of the forklift 18.

At that time, the detection device 40 of the forklift 18 recognizes that a product 13 has been placed onto the forklift 18 and turns on the RFID reader 20, which causes the RFID reader 20 of the forklift 18 to then turn on antennas 21A-C and read the tag number or ID of the product designation RFID tag 34 on the product 13 just picked up from the shelf 12. Once the RFID reader 20 locks onto the product 13 just picked up from the shelf 12, the RFID reader 20 then queries the tracking application 36 via the communication devices 22 and 24 with the product 13 information obtained from the product designation RFID tag 34. Then, the RFID reader 20 of the forklift 18 detects the closest location designation RFID tag 30 or 32, using the antennas 21A-C, as the product 13 is moved within the environment 10 to another bay 14, for example. When the product 13 is placed on a shelf 12 at the bay 14, the detection device 40 detects that the product 13 has been removed from the forklift 18 (signaling a drop-off event), and the detection device 40 causes the RFID reader 20 to signal the antennas 21A-C to detect the new location (if it has not already) and registers that new location with the tracking application 36 of the asset tracking and management device 26 by providing the asset tracking and management device 26 with the product tag ID and with the closest or latest detected location designation RFID tag ID 30 or 32. The tracking application 36 then stores this new location information with the product information in the product and order database 27.

In a similar manner, as a forklift 18 delivers a product 13 to a truck via one of the loading bays 16, and when the detection device 40 on the forklift 18 detects a drop-off event, the RFID reader 20, through the use of the antennas 21A-C of the forklift 18 reads the closest location designation RFID tag 32 from the closest loading bay 16 and the RFID reader 20 receives and provides that information to the tracking application 36 to indicate that the product 13 with the detected RFID tag has been dropped off or delivered to a particular loading bay 16 (based on the location designation RFID tag 32 of the bay 16).

Figure 5:
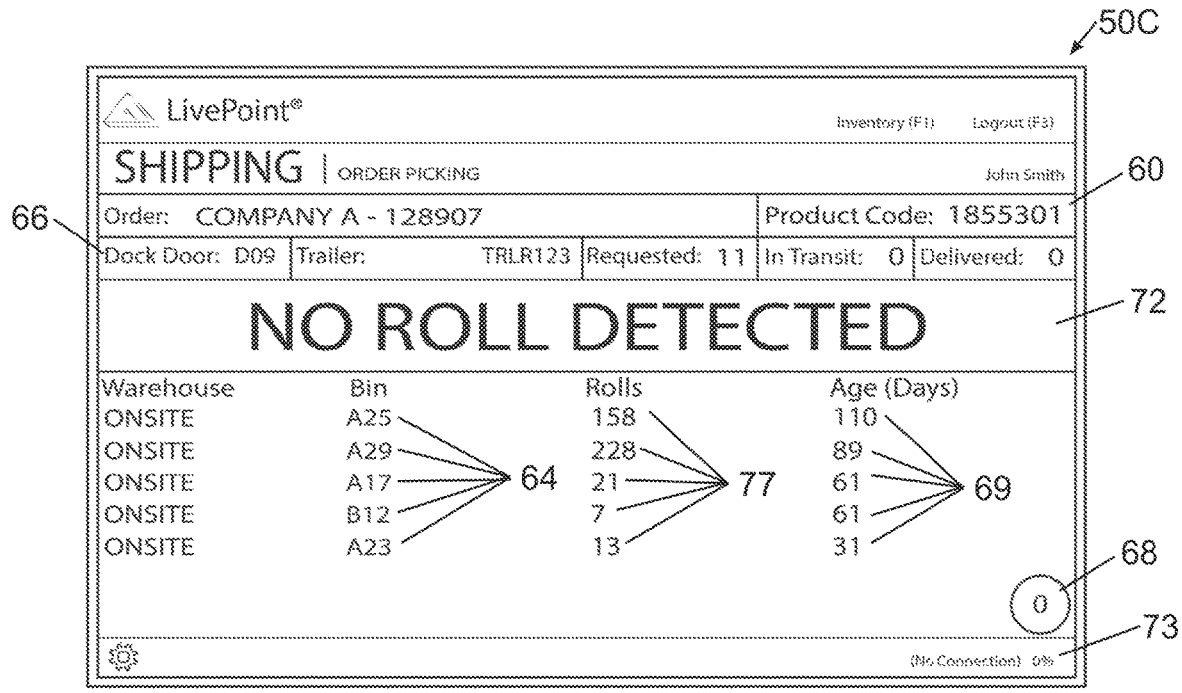
FIG. 5 is an example of a display screen of a user interface device used to move products within a storage facility.
Figure 9:
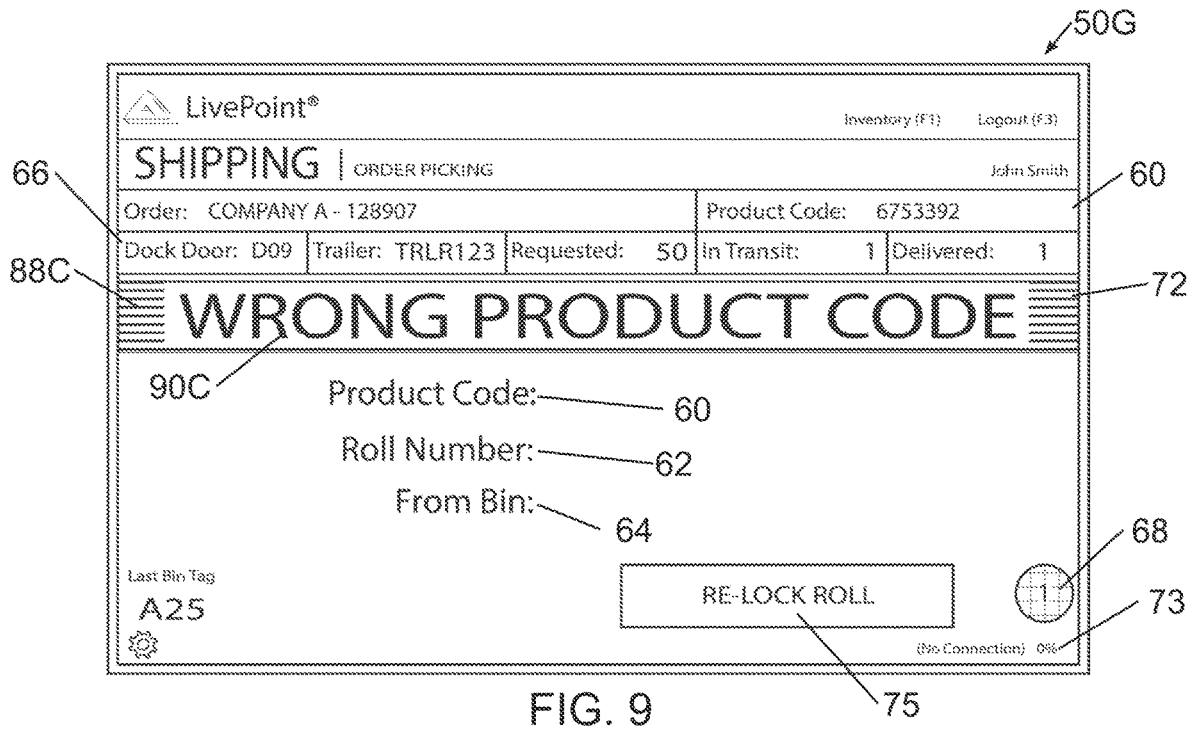
FIG. 9 is an example of a warning shown on a display screen of a user interface to indicate an incorrect pick up of a product.
Figure 13:
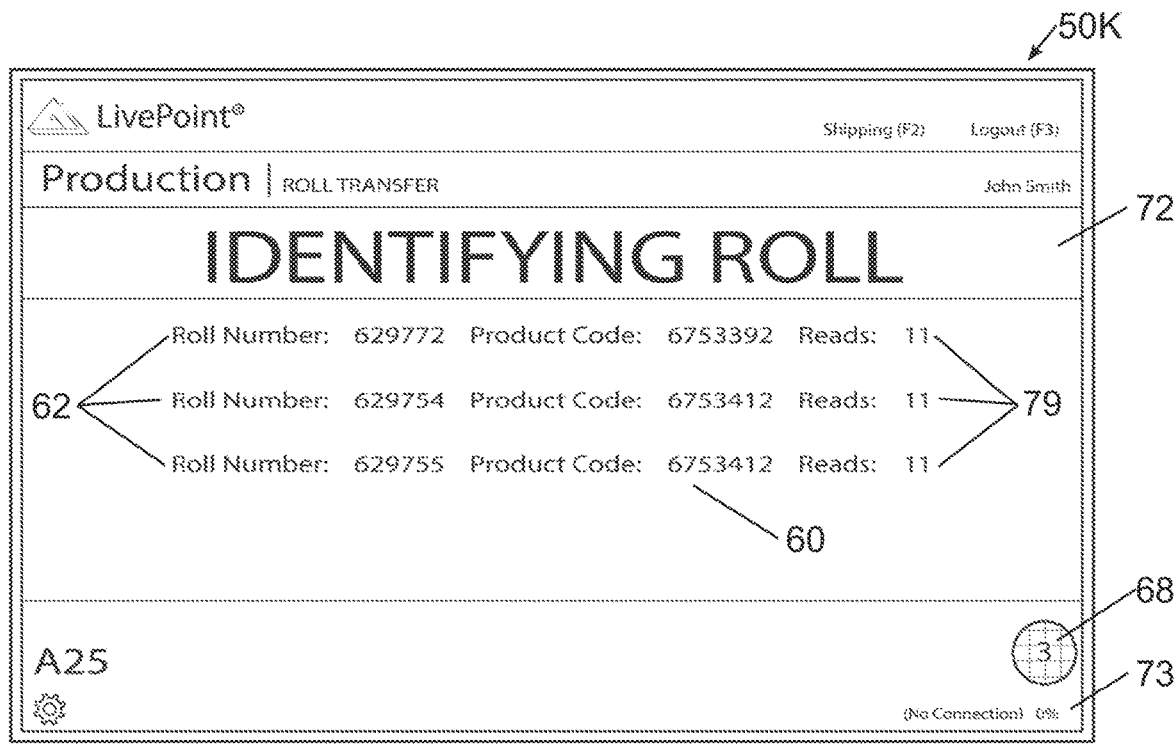
FIG. 13 is an example of a display screen of a user interface device when a radio frequency identification (RFID) reader has detected multiple products within a detection radius.
Figure 15:
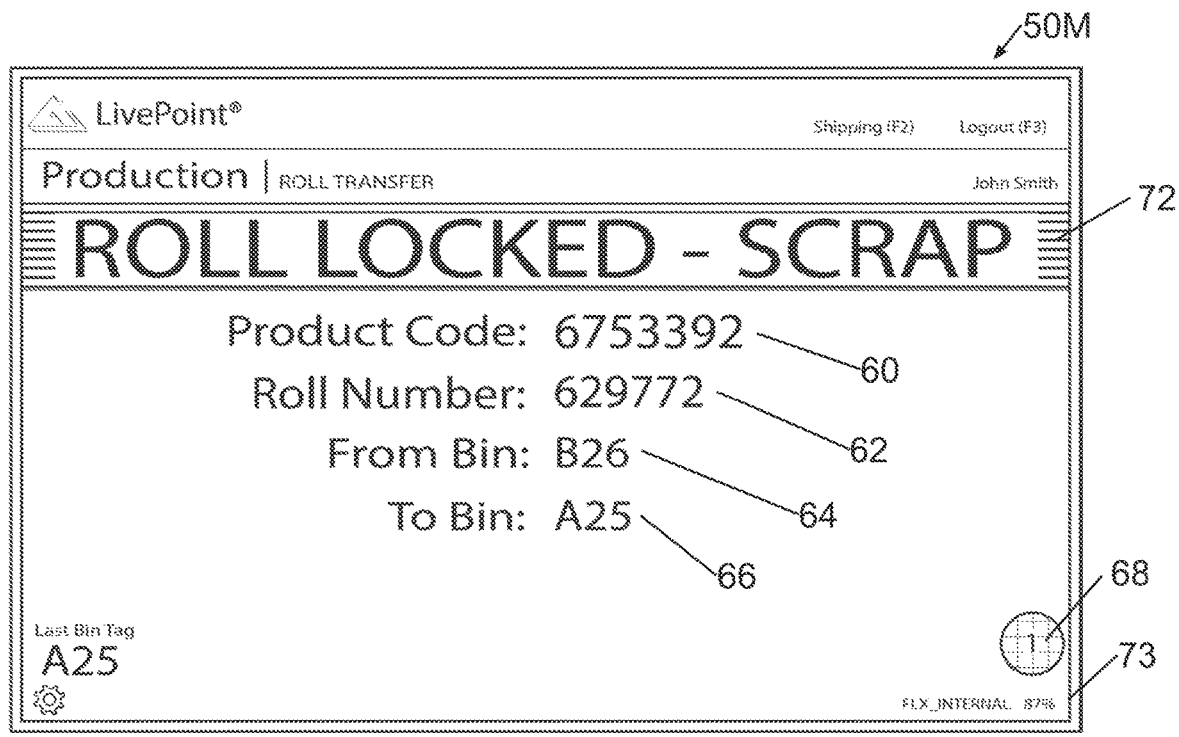
FIG. 15 is an example of a warning shown on a display screen of a user interface device to indicate a radio frequency identification (RFID) reader has locked onto a product designated as "scrap."
Figure 16:
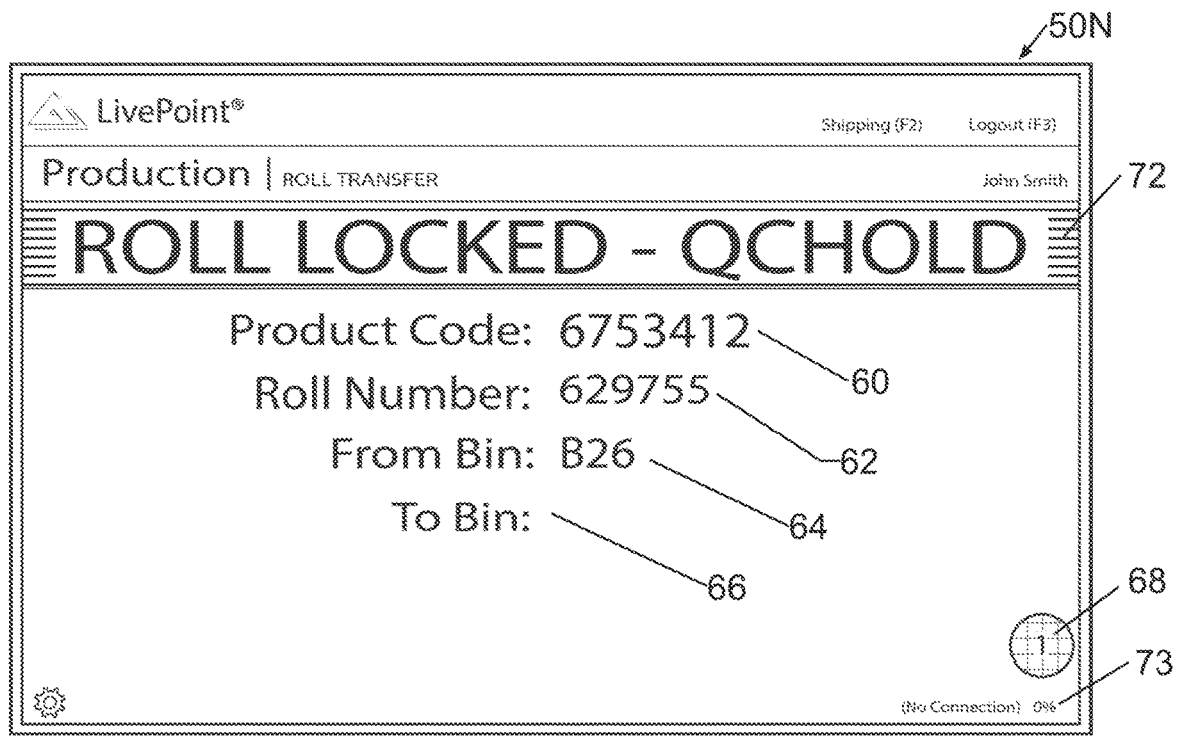
FIG. 16 is an example of a warning shown on a display screen of a user interface device to indicate a radio frequency identification (RFID) reader has locked onto a product on hold for quality control "QC".

As will be understood, when a particular order is to be implemented (i.e., a product or group of products 13 are to be placed on a truck to be delivered to a customer, for example), the tracking application 36 may generate a signal to a user interface device 23 on one of the forklifts 18 telling the forklift operator to pick up a particular product 13 and deliver that product 13 to a particular loading bay 16 to be placed on a particular truck which will be accepting the product 13 for delivery of the order. In this case, the tracking application 26 may provide the forklift operator with an indication of the bay 14 at which the product 13 is located based on the last known position of the product 13 as stored by the product and order database 27. The forklift operator may then drive the forklift 18 to the appropriate bay 14, find the product 13, and pick up the product 13 using the forklift 18, thereby generating a pick-up event. Thus, at this time, the detection device 40 on the forklift 18 detects the presence of a product 13 on the forklift 18 and may turn on the RFID reader 20 of the forklift 18. The RFID reader 20 then turns on the antennas 21A-C and signals the antennas 21A-C to read the RFID tag ID associated with the product designation RFID tag 34 on the product 13. The RFID reader 20 may communicate that information directly, or via the user interface device 23, to the tracking application 36 using the communication network devices 22, 24 and queries the tracking application 36. The tracking application 36 then determines whether the RFID tag ID associated with the product 13 that is now currently on the forklift 18 is the correct RFID tag ID for the actual product 13 associated with the order that is being implemented (using the order and product information in the database 27). The application 36 then sends information indicative of this analysis to the user interface device 23 on the forklift 18 informing the forklift operator whether the correct product 13 for the order is now on the forklift 18. If the forklift operator has picked up an incorrect product for the order, the user interface device 23 may indicate to the operator that the wrong product is on the forklift 18 using any desired method, such as by flashing a red screen and sounding an audible alarm, providing a message on the screen of the user interface device, etc. In particular, the user interface device 23 may display a red error box and emit a first audible alarm, for example, to the forklift operator to indicate that the incorrect product 13 has been picked up for the order that is being implemented, as shown in FIGS. 9, 15, and 16. On the other hand, if the correct product is on the forklift 18, the user interface device 23 may indicate a message to the operator, flash or causes the screen to turn a particular color, such as green for example, and/or sound an audible signal indicating that the correct product for the order being implemented is on the forklift 18. In particular, the user interface device 23 may display a green box and emit a second audible alarm, for example, to the forklift operator to indicate that the correct product 13 has been picked up for the order that is being implemented, as shown in FIGS. 5 and 13.

After the forklift operator picks up the correct product 13 and gets, for example, a green screen and audible alarm, or other indication on the user interface device 23 to proceed, the forklift operator then drives to one of the loading bays 16 to deliver the product 13 to a truck. The RFID reader 20 on the forklift 18 may turn on the antennas 21A-C (if not on already) and signal the antennas 21A-C to determine the position of the forklift 18 as it approaches a particular loading bay 16 by reading the location designation RFID tags 32 associated with each loading bay 16 as the forklift 18 passes the loading bays 16. The user interface device 23 or the RFID reader 20 may communicate this location information to the tracking application 36 which may determine if the loading bay 16 being detected is the loading bay 16 at which the product 13 is to be placed on a truck for this order, and may send the results of the determination to the user interface device 23 of the forklift 18 in real time, to thereby instruct the forklift operator if he or she is at the correct loading bay 16. In another case, when the forklift 18 goes up to or onto a truck at a loading bay 16 and performs a drop-off event, the user interface device 23 or the RFID tag reader 20 of the forklift 18 may send the current location of the forklift 18 (based on the currently detected or last detected location designation RFID tag 32) to the tracking application 36 which determines if the forklift 18 is at the correct loading bay 16 for the order being implemented. Thus, the tracking application 36 determines whether the forklift 18 is near or at the appropriate loading bay 16 that is associated with the truck that is actually used for delivering the product 13 sitting on the forklift 18 for the order that is being implemented. In any event, the tracking application 36 sends a signal to the user interface device 23 of the forklift 18 to indicate to the forklift operator that the forklift 18 is at the wrong truck or loading bay 16 or that the forklift 18 is at the correct truck or loading bay 16. The tracking application 36 or the user interface device 23 may use any desired mechanism for notifying the forklift operator of this determination, such as by flashing red or green signals to the user, by sounding an audible alarm or signal, etc., to tell the forklift operator that he or she is at the correct or incorrect truck or loading bay 16. In particular, the user interface device 23 may display a purple box and emit an audible alarm, for example, to the forklift operator to indicate that the correct product 13 has been delivered to the correct truck or loading bay 16. In this manner, the centralized asset tracking and management device 26 directs the forklift operator to pick up the appropriate product 13 for an order, may indicate that the appropriate or non-appropriate product 13 for a particular order is actually on the forklift 18, direct the forklift operator to the appropriate loading bay 16 to which to take the product 13 for an order, and tracks and indicates to the forklift operator that the product 13 is being dropped off at the correct loading bay 16, all based on the RFID tag location information and the RFID product tag information sent to the tracking application 36 from the forklift 18 during operation of the forklift 18.

Various different operations of the inventory tracking and management system will now be described in relation to FIGS. 3-26. As discussed above, when a particular order is to be implemented (i.e., a product or group of products are to be placed on a truck to be believed to a customer, for example), the tracking application 36 may generate a signal to a user interface device 23 on one of the forklifts 18 telling the forklift operator to pick up a particular product 13 and deliver that product 13 to a particular loading bay 16 to be placed on a particular truck which will be accepting the product 13 for delivery of the order.

Figure 3:
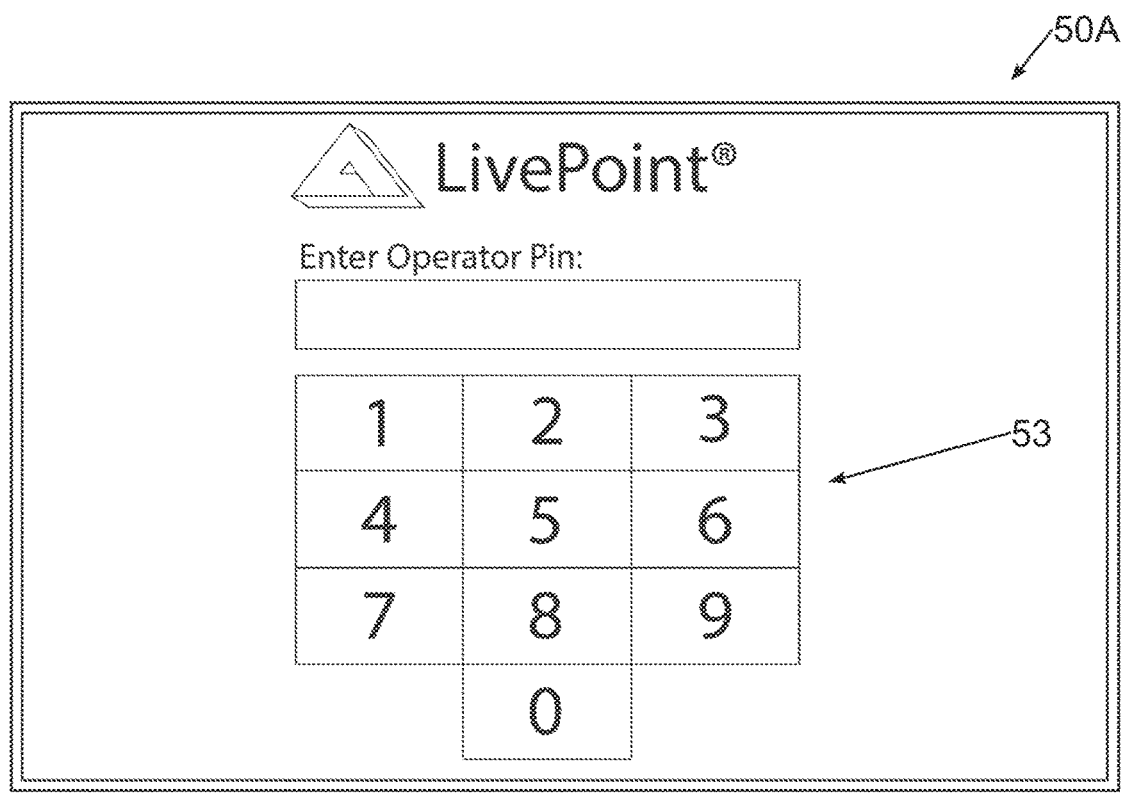
FIG. 3 is an example of a display screen of a user interface device used to log into an RFID-based inventory tracking system.
Figure 4:
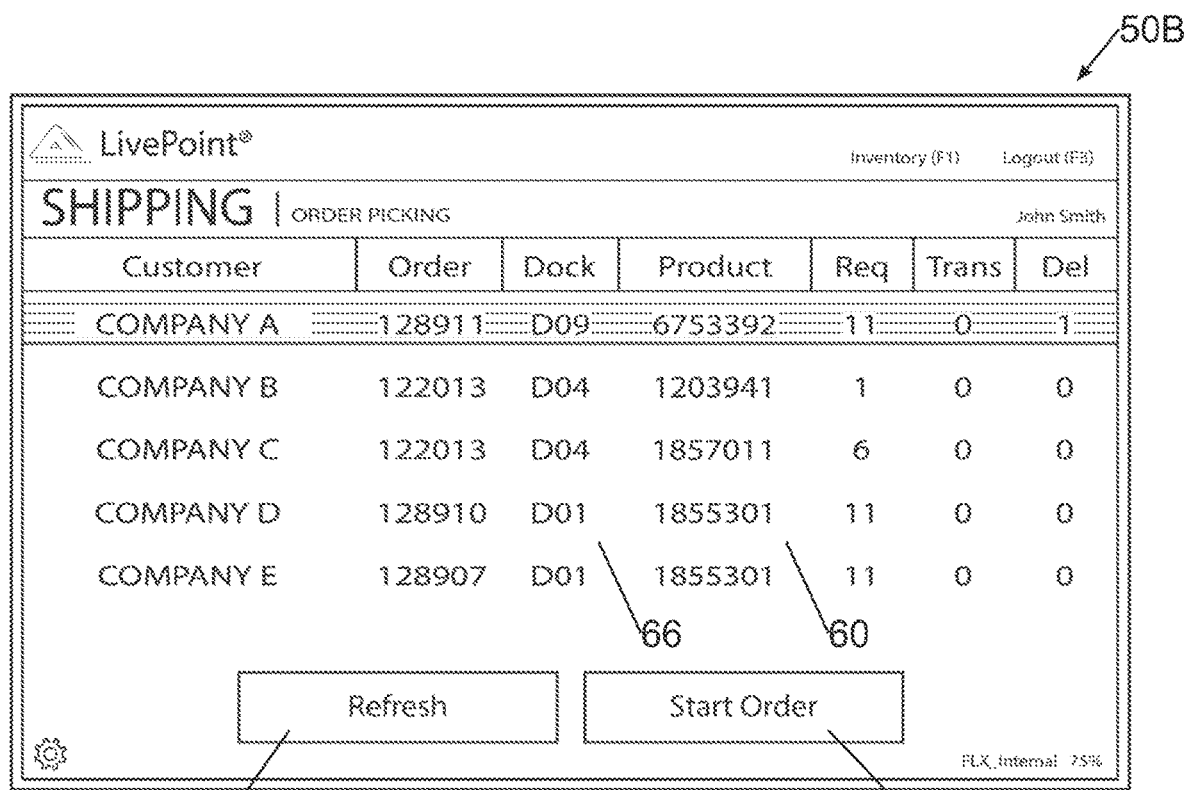
FIG. 4 is an example of a display screen of a user interface device used to select an order to fulfill.

FIG. 3 illustrates an example of a sign-in screen that may be shown on a display screen 50A of the user interface device 23. When displayed, the sign-in screen may require a forklift operator to enter an operator pin using a keypad 53 prior to using the system as described above. Each forklift operator may have a unique operator pin that is stored on a memory of the centralized asset tracking and management device 36. A forklift operator name, forklift operation description, and other forklift operator identifiers may be associated with each unique operator pin and also stored on the memory of the centralized asset tracking and management device 26. In other examples, the user interface device 23 can include a biometric scanner in lieu of, or in addition to, the keypad 53 to determine which forklift operator is operating the forklift 18. In such an example, the biometric scanner can be any device that uses a unique biometric identifier to determine the identity of the forklift operation, such as, an iris scanner, a fingerprint scanner, or face scanner. By requiring each forklift operator to sign-in, or login, prior to using the system, the user interface device 23, along with the centralized asset tracking and management device 26 can track when a particular forklift operator picked up a particular product 13 at a particular bay 14 and when the particular forklift operator dropped off the particular product 13 at a particular truck or loading bay 16, through the use of time-stamps. Once the forklift operator signs into the system, the display screen 50B of the user interface device 23 may display a number of pending orders that are to be completed, as illustrated in FIG. 4. In particular, FIG. 4 illustrates a display screen 50B of the user interface device 23 displaying a customer, order number, dock 16 that a product 13 is to be delivered to, a product code 60, the number of products 13 requested, the number of products in transit, and the number of products 13 actually delivered. From this display screen 50B the forklift operator may select a particular order to fulfill by interacting with the display screen 50B of the user interface device 23 (for example, by touching, swiping, or pressing the display screen 50B). Once the forklift operator selects an order the fulfill, the forklift operator pressed a start order input 29 to begin the order. In some examples of the system, the tracking application 36 may periodically update the information displayed on the display screen 50B by querying the product and order database 27 and sending the results of that query to the user interface device 23, which is then displayed on the display screen 50B. In other examples, a forklift operator can manually update the information displayed on the display screen 50B by pressing the refresh input 27.

Figure 6:
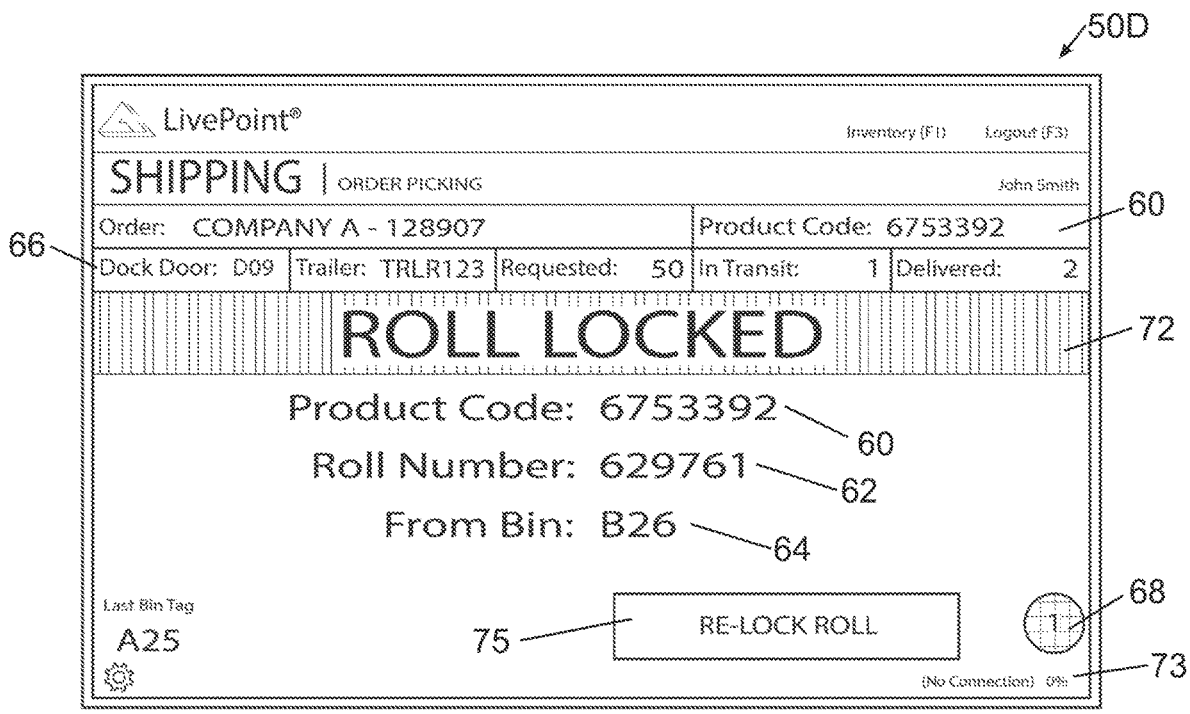
FIG. 6 is an example of a display screen of a user interface device used to move products within a storage facility once a product is picked up.

FIGS. 5-18 illustrate examples of information that may be shown on a display screen 50 of the user interface device 23 during this activity. Common elements between FIGS. 5-18 are shown using common reference numerals. In particular, FIGS. 5-10 illustrate examples of the information displayed to the forklift operator on a display screen 50 of the user interface device 23 when a product 13 in the storage and shipping environment 10 needs to be relocated to a particular bin 14 or delivered to a particular loading bay 16 and placed on a truck. FIGS. 5, 6, 7, 8, 9, and 10 illustrate a display screen 50C, 50D, 50E, 50F, 50G, and 50H, respectively, of the user interface device 23 displaying a product code 60, a roll number 62 (as in this case the product 13 is a roll of material), a current location 64 of a product 13, a destination 66 of the product 13, an RFID tag counter 68, a next roll input 70, a product information menu 72, and a relock-roll input 75. The product code 60 and the roll number 62 are displayed on the display screen 50D and correlate to the product information stored in the product and order database 27. Such information may be used by the forklift operator, for example, to confirm product delivery information (e.g., the product code 60 or the roll number 62) with a truck driver or other storage facility worker. Additionally, the product delivery information is shown in multiple locations 60, 64, and 66 on the display screens 50C, 50D, 50E, 50F, 50G, and 50H. In particular, when the RFID reader 20 queries the tracking application 36, for example, the tracking application 36 sends product information from the product and order database 27 to the user interface device 23, after the RFID reader 20 has locked on to one product 13, as illustrated in FIG. 6. The product information sent by the tracking application 36 to the user interface device 23 shown on the display screen 50B includes, for example, the current location 64 of the product 13, the destination 66 of the product 13, and the trailer truck, if the destination 66 of the product is a bay 16 with a truck waiting to be loaded.

FIGS. 5 and 6 also illustrate the RFID tag counter 68 displaying zero (0) RFID tags read by the RFID reader 20 and one (1) RFID tag read by the RFID reader 20, respectively. The user interface device 23 receives information about how many RFID tags 34 the RFID reader 20 currently reads or detects from the antennas 21A-C, which are stored when the RFID reader 20 sends such information to the user interface device 23 or the tracking application 36. In particular, as the forklift operator drives toward the product 13, there may be multiple other products 13 located nearby. As a result, when the detection device 40 instructs the RFID reader 20 to turn on and, thus, signal the antennas 21A-C to begin reading the product designation RFID tags 34, the antennas 21A-C may pick up multiple product designation RFID tags 34. Accordingly, the RFID reader 20 queries the tracking application 36 as the RFID reader 20 reads or detects the multiple product designation RFID tags. The remote tracking application may receive this information and may send it to the centralized tracking application 36 which may verify these codes. However, prior to the remote tracking application sending the read information or querying the centralized asset tracking and management device 36, the RFID read 20 must "lock onto" one product designation RFID tag 34, as illustrated in FIG. 6. The tracking application 36 may also relay the detected product information from the centralized asset tracking and management device 26 to the user interface device 23 and the number of valid product codes may then be shown on the display screen 50C-H. Of course, the remote tracking application may simply display the number of detected product codes or tags on the screen 50C-H of the user interface device 23 without communicating with the centralized tracking application 36. In any event, the number of RFID tags read by the RFID reader 20 is thus displayed in real time to the forklift operator. Additionally, the RFID tag counter 68 serves to inform the forklift operator when the RFID reader 20 has identified the product 13 being carried by the forklift 18. As discussed above, the RFID reader 20 may detect multiple product designation RFID tags 34 in the process of the forklift operator picking up the desired product 13. The RFID reader 20 may detect, for example, zero (0) product designation RFID tags 34 when not in proximity to any products 13, as depicted in FIG. 5, four (4) product designation RFID tags 34 when between shelves 12 and in proximity to multiple products 13, or one (1) product designation RFID tag 34 when the product 13 is picked up by the forklift 18 and is the only product in the range of the antennas 21A-C, as depicted in FIG. 6. To reduce the number of tags being read to one, once the forklift 18 picks up the product 13 from the required bay 14, the forklift 18 may reverse out of the bay 14 and maneuver into the path between shelves 12, and then turn to be substantially parallel to the shelves 12 that surround the forklift 18. During this process, multiple product designation RFID tags 34 may be detected as a result of the detection radius of the RFID reader 20 and the antennas 21A-C. However, once the forklift 18 is substantially parallel to and in the middle of the shelves 12, the RFID reader 20 and the antennas 21A-C will read or detect only the product designation RFID tag 34 that is associated with the product 13 being carried by the forklift 18. In particular, when one (1) product designation RFID tag 34 is detected by the RFID reader 20, the display screen 50C of the user interface device 23 shows that one product designation RFID tag 34 is detected and may further indicate to the forklift operator that the product 13 has been positively identified as the correct product 13 for the particular order to be implemented. As depicted in FIG. 6, the user interface device 23 may display such a confirmation by, for example, indicating that the product 13 has been successfully identified as the correct product for the delivery being implemented using the RFID reader 20, detection device 40, and the tracking application 36, as described extensively above. Such an indication may be shown by either the RFID tag counter 68 showing only one RFID tag 34 is being read and displaying "PRODUCT LOCKED" in the product information menu 72. In some examples, however, the forklift 18 does not need to be substantially parallel to the shelves 12 that surround the forklift 18 for the RFID reader 20 to lock onto the product 13 carried by the forklift 18. In such examples, the forklift 18 can move five (5) to eight (8) feet away from the shelves 12 that surround the forklift 18 to allow the RFID reader 20 to lock onto the product 13 carried by the forklift 18.

The display screen 50C may display additional product information received from the product and order database 27 of the tracking application 36 once the forklift operator begins a particular job. In use, after the particular job has been selected from the display 50 of the user interface device 23, the user interface device 23 may, in response to a selection of the particular job, query the centralized tracking application 36 or the product database 27 to locate the oldest product 13 in the environment 10 that is suitable for the particular order that the forklift operator is completing. For example, the tracking application 36 can send product information such as, at what bay 14 the product 13 is located, how much 77 of the product is located at each of the bays 14, and how long 69 the product 13 has been stored at the bay 14. Many products 13 stored in the environment 10 may have a limited shelf life and, as a result, it may be important to ensure that the products 13 stored longer are first used to fill orders rather than the most recently stored products 13. To perform this function, the product database 27 may store an age or time (e.g., an arrival time) for each product 13 to be able to track how long each product 13 has been on a shelf 12 or in the system database 27, and the tracking application 36 may query the product and order database 27 for the oldest (or newest) product of a particular type to use for an order. The application 36 may then return this product designation in response to a forklift operator being assigned an order. Further, in some aspects of the system, rather than displaying multiple products 13 on the display screen 50C, the product and order database 27 may send to the user interface device 23, via the tracking application 36, product information for only the oldest product (i.e., the product 13 that has been stored the longest) that would satisfy the order, which would force a forklift operator to select the oldest product.

Figures 19, 20:
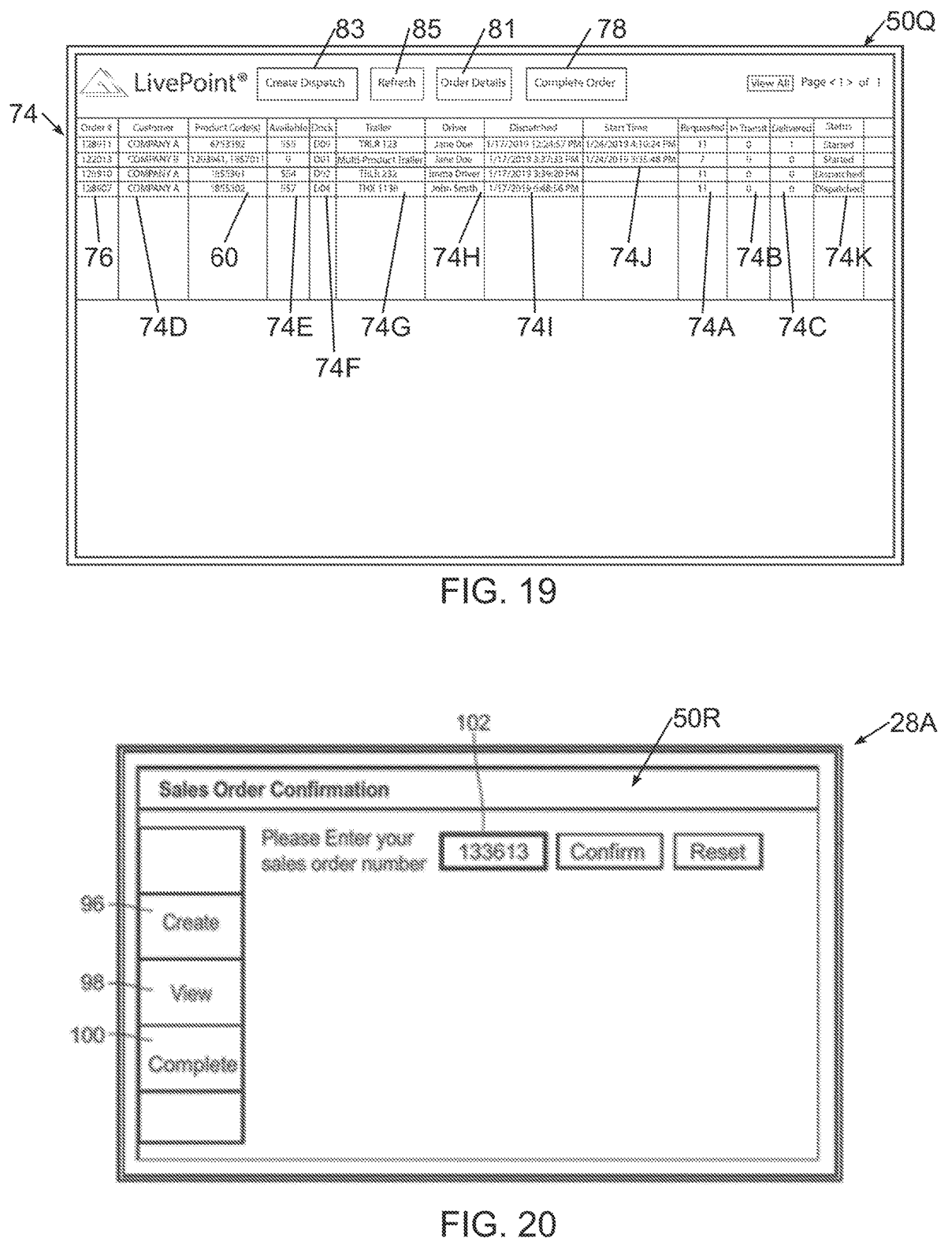

In addition to the information displayed on the display screen 50C of FIG. 5, FIGS. 6, 7, and 8 illustrate the re-lock roll input 75, the next roll input 70, a next order input 80, and a force complete input 84. The re-lock roll input 75 allows the user interface device 23 to signal to the RFID reader 20 that the RFID reader 20, for example, "locked" onto a product 13, but not the product 13 that the forklift operator picked up. For example, if a forklift operator picks up a product 13 from a stack of products 13, the RFID reader 20 can lock onto a product 13 at the bottom of the stack of products rather than a product 13 at the top of the stack of products 13 that was actually picked up by the forklift operator. To re-lock the RFID reader 20 on the product 13 actually carried by the forklift 18, the forklift operator interacts with the display screen 50C of the user interface device 23 (e.g., by touching or pressing the re-lock roll input 75) and, in response, the user interface device 23 sends a signal to the RFID reader 20 to detect and read the product designation RFID tag 34 disposed on the product 13 on the tongs of the forklift 18. The RFID reader 20 then uses the antennas 21A-C to read and detect the product designation RFID tag 34 disposed on the product 13 on the tongs of the forklift 18 again. The user interface device 23 may, however, automatically "re-lock" the product 13 without being prompted to do so. For example, the user interface device 23 can automatically send a signal to the RFID reader 20 after a predetermined duration (e.g., 3 seconds, 5 seconds, 7 seconds) once a pick-up event is detected, as extensively described above, to have the RFID reader 20, through the use of the antennas 21A-C, re-read and re-detect the product designation RFID tag 34 disposed on the product 13 carried by the forklift 18. The next roll input 70 allows the user interface device 23 to signal to the tracking application 36 that the forklift operator has dropped off a particular product (e.g., a roll of product 13) and needs to know the location of another product that would satisfy the order. Once the forklift operator interacts with the user interface device 23 (e.g., by touching, swiping, or pressing the next roll input 70 on the display screen 50), the user interface device queries the order and product database 27 and the tracking application 36 sends the user interface device 23 the product information requested. The user interface device 23 may then display, via the display screen 50C, the requested product information as depicted in FIG. 5. The next order input 80 allows the user interface device 23 to signal to the tracking application 36 that a forklift operator is no longer working on a particular job, for example, because there are enough products 13 in transit to fulfill the particular job, a rush job must be completed before the current job is completed, etc. To end the particular job, the forklift operator may interact with the user interface device 23 (e.g., by touching, swiping, or pressing the next order input 50 display screen 50). In response, the user interface device 23 sends a signal to the tracking application 36 indicating that a particular operator is no longer working on the particular job. The tracking application 36 stores the information in the product and order database 27 and sends the user interface device 23 a list of outstanding jobs the forklift operator may choose, as depicted in FIGS. 4 and 19. The force complete input 84 allows the user interface device 23 to signal to the tracking application 36 that a particular order has been completed even if the number of requested product transfers 74A stored in the database 27 is not zero for that particular order. For example, if a client requires weekly delivers of a particular product 13 that is stored in the environment 10 and sends the same sized truck (i.e., each truck has the same or similar capacity to store and transport products 13) each week, but on occasion the client sends a smaller truck (i.e., a truck that has a smaller storage and transport capacity than trucks usual sent), the forklift operator will not be able to place the required amount of requested product transfers 74A as is reflected in the product and order database 27. In such a situation, the operator may use the force complete input 84 as displayed via the user interface device 23, to force complete or close the order to reflect the actual amount of products delivered for that particular order. Additionally, a job (i.e., a roll or product that needs to be transported from one location to another, such as from a particular bin 14 to a particular loading bay 16 to be put on a truck) may not be reflected in the tracking application 36 as being completed until the forklift operator has exited the particular job (i.e., by interacting with the display screen 50 by either touching, swiping, or pressing the next order input 80).

Figure 7:
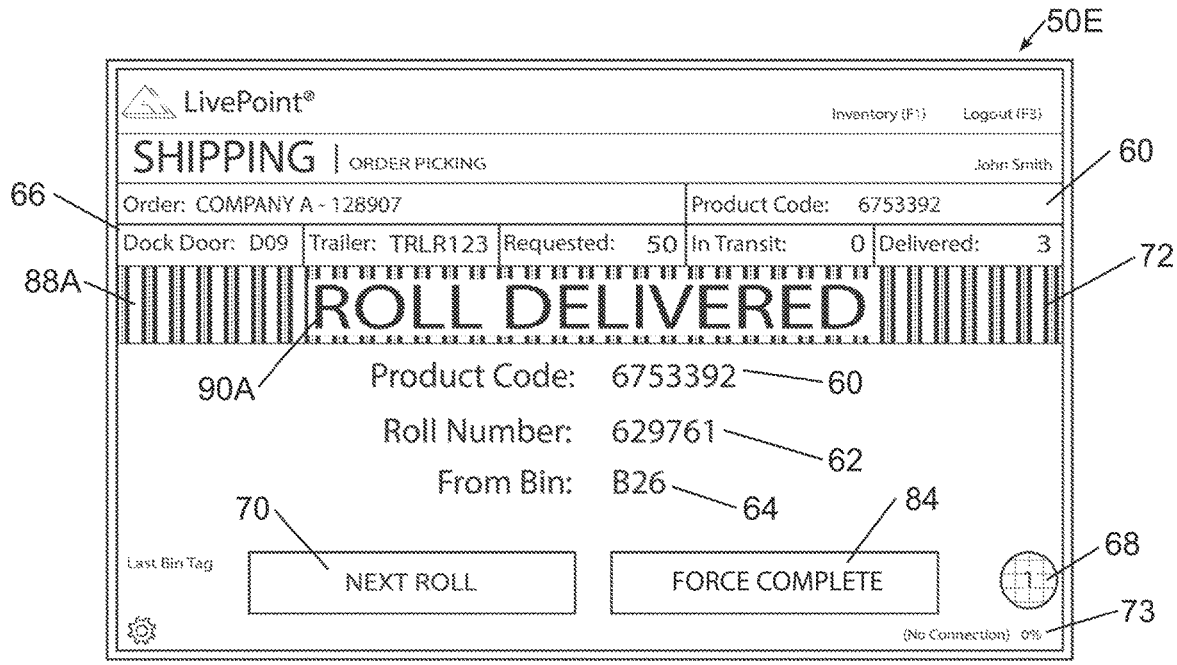
FIG. 7 is an example of a display screen of a user interface device when a particular product has been delivered to a destination.
Figure 8:
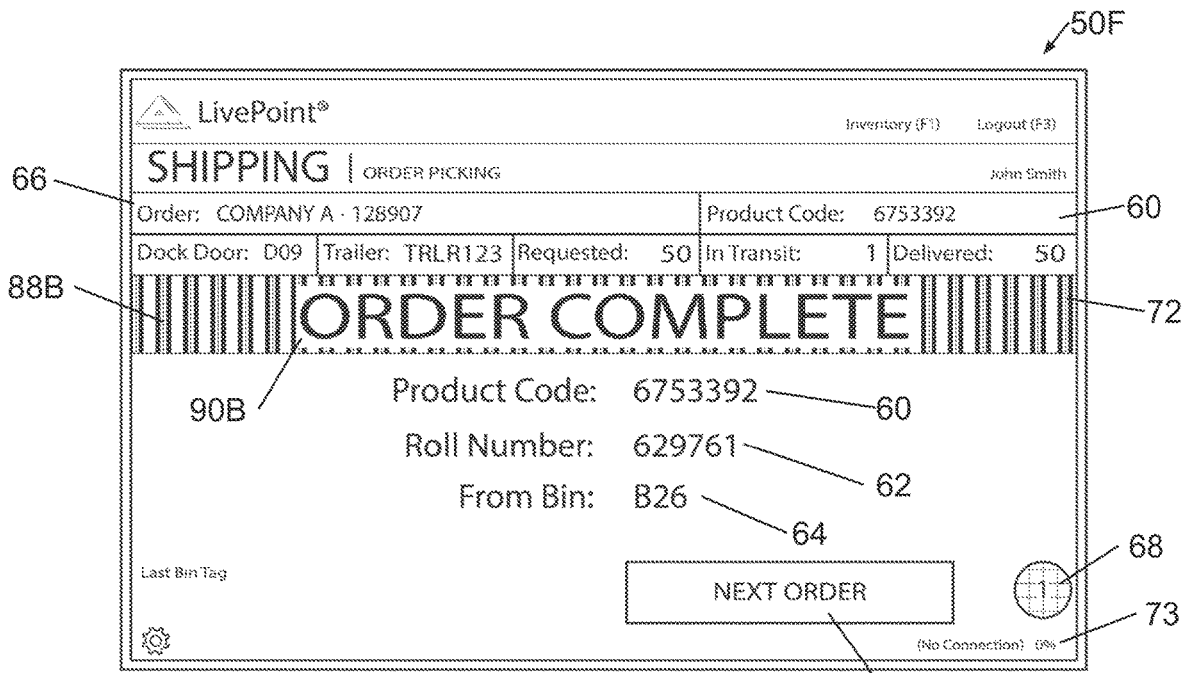
FIG. 8 is another example of a display screen of a user interface device when a when particular order for a particular product has been fulfilled.
Figure 10:
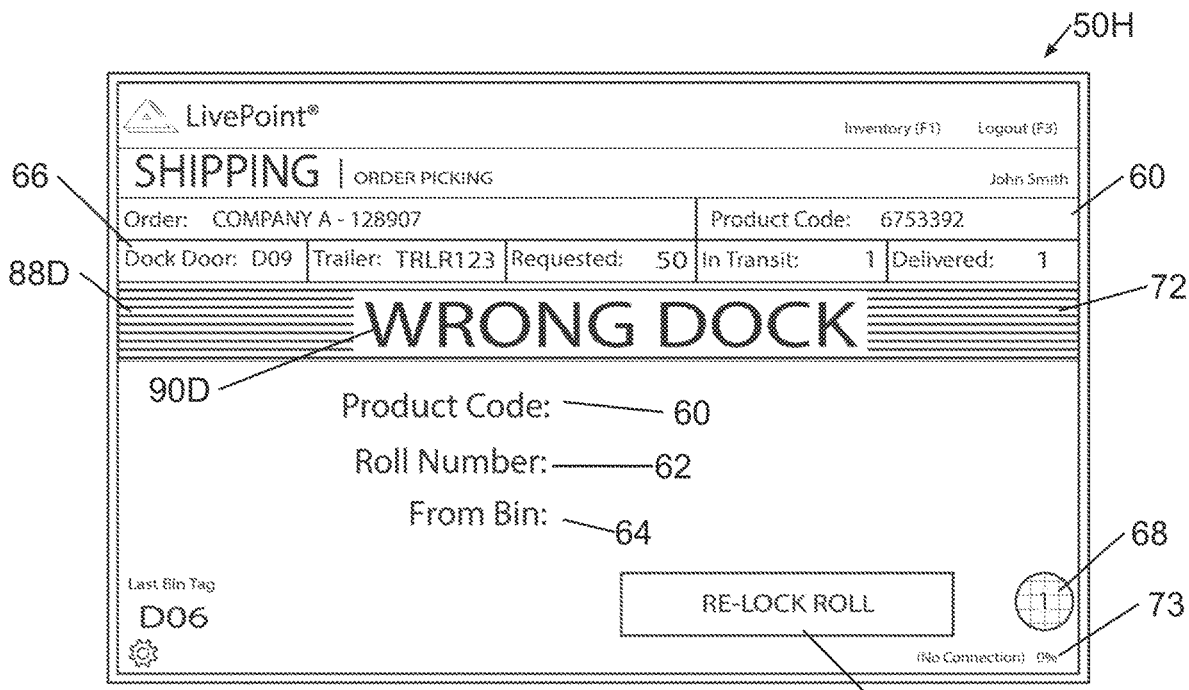
FIG. 10 is an example of warning shown on a display screen of a user interface device to indicate a product has been brought to an incorrect loading dock.
Figure 11:
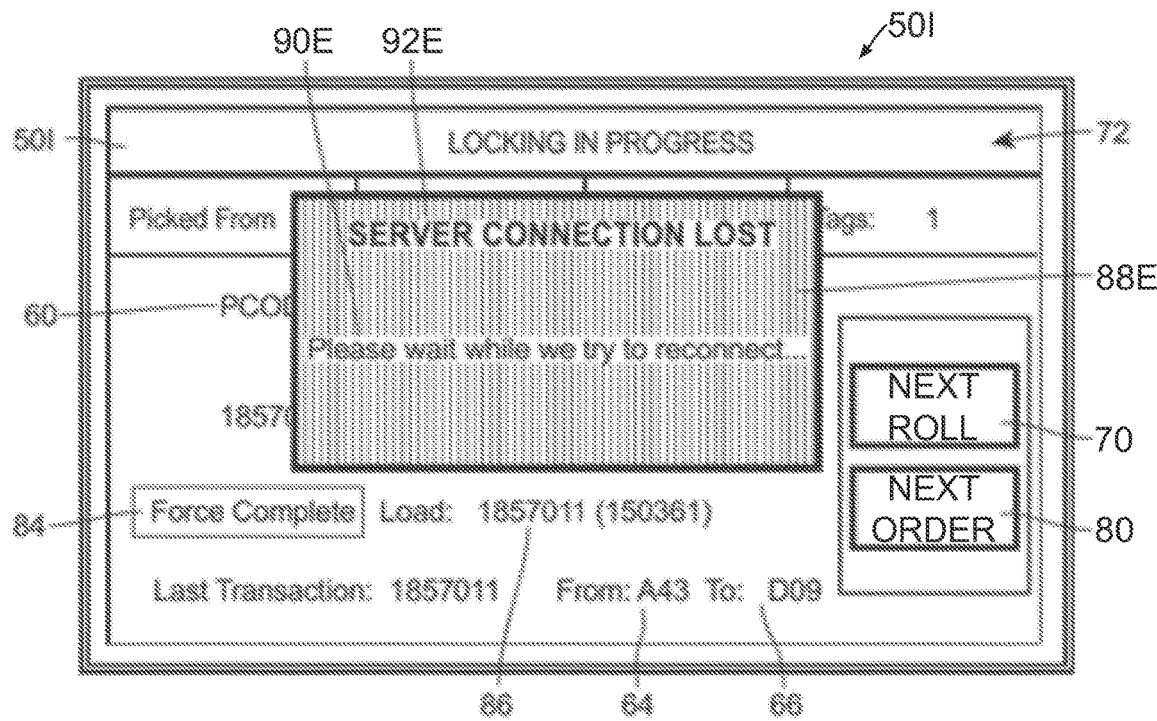
FIG. 11 is an example of a warning shown on a display screen of a user interface device to indicate a loss of communication signal from a centralized tracking system device.

In the process of transporting products 13 within the environment 10 to either move the product 13 from one bin 14 to another bin 14 or move the product 13 from a particular bin 14 and deliver the product 13 to a loading bay 16 to be put on a truck, the user interface device 23 may display a variety of messages on the displace screen 50. FIGS. 7 and 8 illustrate two possible positive messages 88A and 88B and FIGS. 9, 10, and 11 illustrate three possible error messages 88C, 88D, and 88E. In particular, FIG. 7 illustrates a roll delivered message 88A, which includes a message 90A; FIG. 8 illustrates an order complete message 88B, which includes a message 90B; FIG. 9 illustrates an incorrect product pick up error message 88C, which includes an error message 90C; and FIG. 10 illustrates an incorrect bay message 88D, which includes an error message 90D. FIG. 11 illustrates a connection loss error message 88E, which includes an error message 90E and an error title 92E. As discussed above, the RFID reader 20 queries the tracking application 36 when the RFID reader 20 locks onto (i.e., reads or pings) only one product 13 and, in the process of implementing an order, the forklift operator may pick up and deliver a correct product 13, pick up and deliver a correct 13 product that completes a particular job, inadvertently pick up an incorrect product 13 for the particular order that is being implemented, or inadvertently pick up a correct product 13, but deliver the correct product 13 to an incorrect bay 16. If the RFID reader 20 queries the tracking application 36 when a product 13 is dropped off and the analysis determines that a correct product 13 has been dropped off, the tracking application 36 may signal the user interface device 23 to display on the display screen 50 the roll delivered message 88A, thereby alerting the forklift operator that the correct product was delivered. If the RFID reader 20 queries the tracking application 36 when a product 13 is dropped off and the analysis determines that a product that has just been dropped off is the last product 13 required to fulfill the order, the tracking application 36 may signal the user interface device 23 to display on the display screen 50 the order complete message 88B, thereby alerting the forklift operator that the particular order is complete. Similarly, if the RFID reader 20 queries the tracking application 36 when a new product 13 is picked up and the analysis determines that an incorrect product 13 has been picked up, the tracking application 36 may signal the user interface device 23 to display on the display screen 50 the incorrect product pick up error message 88C, thereby alerting the forklift operator that a mistake has been made. If the RFID reader 20 queries the tracking application 36 when a new product 13 is en route to be dropped off at a particular bay 16 and the analysis determines that the forklift operator is at an incorrect bay 16, the tracking application 36 may signal the user interface device 23 to display on the display screen 50 the incorrect bay error message 88D, thereby alerting the forklift operator that a mistake has been made. It is important to note that if a forklift operator ignores the incorrect product pick up error message 88C or the incorrect bay error message 88D and places a product 13 incorrectly on a truck at a bay 16, the tracking application 36 will not print the final paperwork necessary for the truck driver to complete his load. Such a feature prevents the truck driver from leaving the facility with incorrect products on his or her truck. Finally, if during the use of the inventory tracking and management system a connected device (e.g., the wireless RFID reader 20, the wireless router or gateway 22, wireless communication node 24, etc.) loses connection to the asset tracking and management device 23, product database 27, or tracking application 36, the connected device that lost connection may signal the user interface device 23 to display on the display screen 50 the connection loss error message 88E of FIG. 11.

Figure 12:
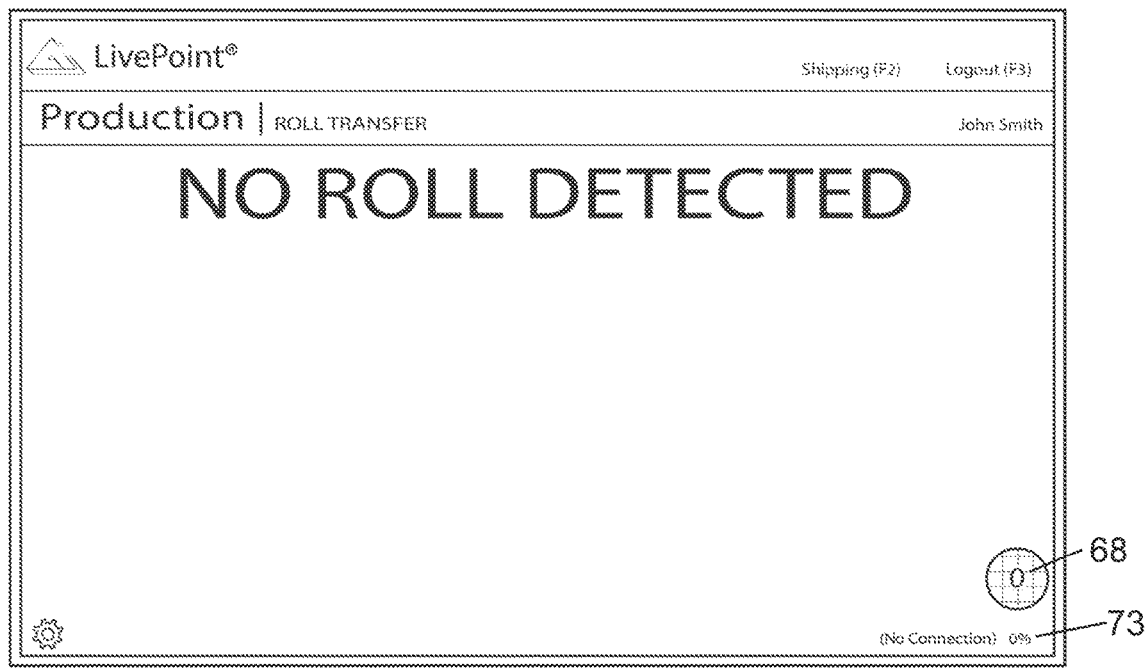
FIG. 12 is an example of a display screen of a user interface device used to move products within a storage facility before picking up a product.
Figure 14:
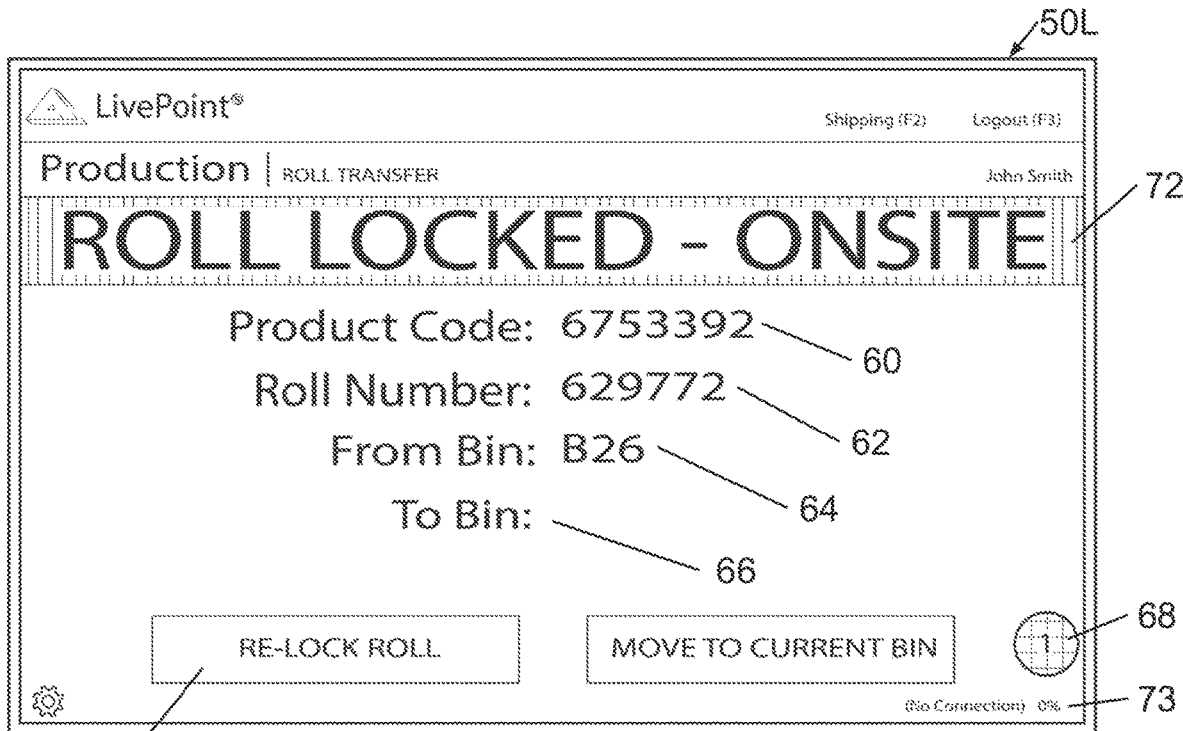
FIG. 14 is an example of a display screen of a user interface device when a radio frequency identification (RFID) reader has locked onto a product.

FIGS. 12-16 illustrate examples of the information displayed to the forklift operator on a display screen 50 of the user interface device 23 when the forklift operator picks up a product prior to, or without, receiving a signal from the tracking application 36 (e.g., the forklift operator is moving a manufactured product into a storage warehouse, the forklift operator is organizing products disposed in a warehouse, etc.). FIG. 12 depicts a display screen 50J of the user interface device 23 displaying a message to the forklift operator that the RFID reader 20, using the antennas 21A-C, does not detect a product 13. FIGS. 13-16 depict a display screen 50K, 50L, 50M, and 50N respectively, of the user interface device 23 displaying the product code 60, a roll number 62 (as in this case the product 13 is a roll of material), the current location of the product 13, a destination of the product 13, an RFID tag counter 68, a re-lock roll option 75, a move to current bin option 71, and a strength of the network connection 73. FIG. 13 also depicts a read number 79, which indicates how many times the RFID reader 20 has read a particular product designation RFID tag 34. Such a feature can be used, for example, as a diagnostic tool to determine the accuracy of the RFID reader 20. The product code 60 and the roll number 62 correlate to the product information stored in the product and order database 27 and may be used by the forklift operator, for example, to determine what bay 14 or shelf 12 the product 13 must be placed in. Similar to the display screens 50C, 50D, 50E, the RFID reader 20 queries the tracking application 36 when the forklift operator picks up the product 13, and the tracking application 36 sends product information from the product and order database 27 to the user interface device 23. Depending on the product 13 picked up by the forklift operator, the tracking application 36 may send different information to the user interface device 23 to be displayed on the display screen 50K, 50L, 50M, and 50N. For example, as depicted in FIG. 14, if the product 13 picked up by the forklift operator is a product that can be shipped, then display screen 50L may display a colored message, for example, a green banner with text, indicating the forklift operator can relocate the product 13 to an area of the facility that other forklift operators are going to, to pick up products 13 to fulfill a delivery. In another example, if the product 13 picked up by the forklift operator is a product that is not to be shipped (e.g., if the product is scrap material, the product still must pass quality control), then the display screen 50M, 50N may display a colored message, e.g., a red banner with text, as illustrated in FIGS. 15 and 16, that instructs the forklift operator to drop off the product 13 at a location within the facility not used to house products for deliveries (e.g., from bay B26 to bay A25, as illustrated in FIG. 15). Additionally, each of the display screens 50J-50N of FIGS. 12-16, may display the strength of the network connection 73 of the user interface device 23 to the network disposed within the facility. This can help forklift operators maintain a strong connection to the network disposed within the facility by alerting them when the connection strength 73 falls below a threshold connection strength.

Figure 18:
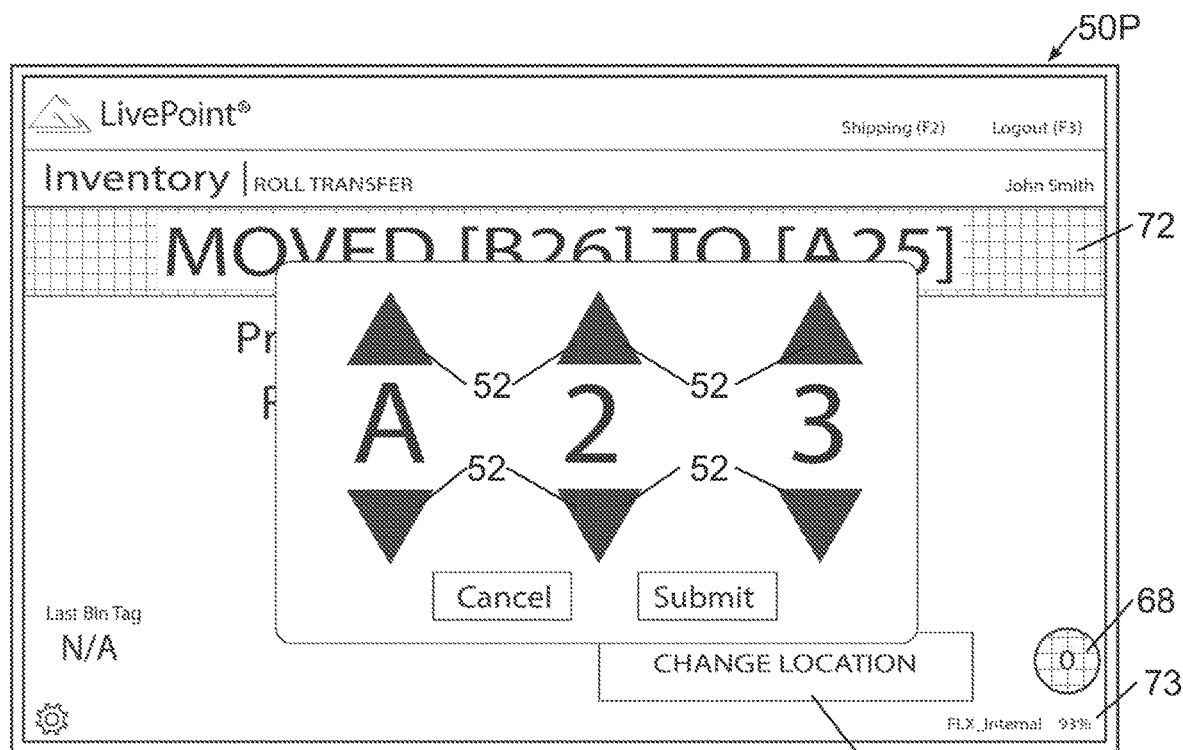
FIG. 18 is an example of a screen display of a user interface device that may be used to manually change or view product location information within a storage facility.

In addition to automatically updating the information about a particular package or product 13 in the product and order database 27 when the product 13 is moved around the environment 10, the tracking system enables a forklift operator to manually modify information about the product 13 stored in the product database 27 through the user interface device 23 as depicted in, for example, FIG. 18. For example, the forklift operator may be driving from one of the loading bays 16 to place a newly delivered product 13 into a particular bay 14. While the forklift operator drives from the loading bay 16 to a particular bay 14, the RFID reader 20 detects the current location of the forklift 18 by observing or detecting the closest or last location designation RFID tag 30 associated with one of the shelves 12 or associated with one of the particular bays 14. However, a signal loss or other signal interference may cause the RFID reader 20 to incorrectly locate the proper location designation RFID tag 30 as the forklift operator drops the product 13 off at the particular bay 14. Additionally, the forklift operator may be dropping off a product 12 in the bay 14 of a shelf 12, which has other shelves 12 and bays 14 around the desired drop off bay 14. While dropping off the product 13 at such a location, it is possible that the RFID reader 20 and the antennas 21A-C read the location designation RFID tag 30 of an adjacent shelf 12 or bay 14 and send incorrect location information to the asset tracking and management device 26 and stored on the product and order database 27. If such an error occurs, the forklift operator may alert a shipping clerk to the mistake or the forklift operator may manually correct the incorrect information stored in the product database 27 directly from the user interface device 23.

Figure 17:
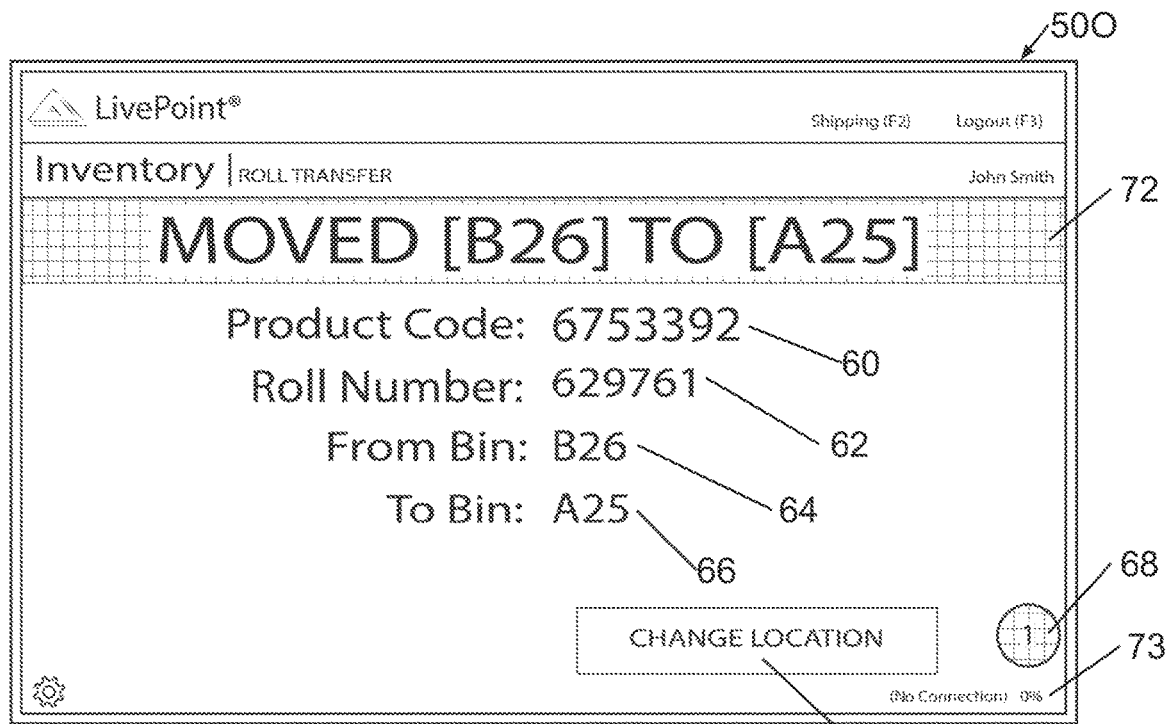
FIG. 17 is an example of a display screen of a user interface device when a product has been moved from one location to a second location.

FIG. 17 depicts a display screen 500 that may be presented on the interface screen 28 of the user interface device 23 to enable the operator to make changes to product locations. In particular, FIG. 17 depicts an example display screen 500 produced by the user interface device 23 when the forklift operator wants to manually change the product location information that is stored in the product database 27 for a particular product 13. The product location information may be stored in the product database 27 using a letter and a number. For example, the letter "A" indicates that the product 13 may be found in column A (or shelf A) and the number "25" indicates that the product may be found in bay 25. Thus, when "A25" is shown on the display screen 50 of the user interface device 23, the forklift operator knows he or she may find the product 13 in bay "25" of column "A". Additionally, if the shelves 12 have multiple rows and a product 13 must be stored on one of the multiple rows, a unique location designation RFID tag 30 may be placed on or near the shelf 12 having multiple rows that would signal to the RFID reader 20 that a particular shelf 12 has multiple rows that could hold a particular product 13. In use, a forklift operator would drive with the product 13 to the shelf 12 indicated on the display screen 50 of the user interface device 23 and when the forklift 18 arrives at the shelf 12, the RFID reader 20, through the use of the multiple antennas 21A-C, reads and detects the unique location designation RFID tag 30. The RFID read 20 then sends a signal to the user interface device 23 indicating that the shelf 12 has multiple rows where a product 13 can be stored. In response, the user interface device 23 displays, via the display screen 50, an additional number that indicates a level, or row, of the shelf 12 at which the product 13 is placed. The forklift operator must select the level, or row, at which the product 13 is place before moving on to another task. For example, if the display 28 of the user interface device 23 shows the product 13 is to be placed on shelf "B23", then the forklift operator knows to navigate to bay 23 in column "B" and, once at the correct shelf 12, the user interface device 23 displays a prompt similar to prompt depicted in FIG. 17, but will also include an additional field with arrows 52 that indicates the particular level, or row, of the shelf 12 the product 13 was placed. However, if such an organizational scheme is desired, additional antennas 21 may need to be placed on the forklift 18 (e.g., the tongs) as well as additional location designation RFID tags 30 may need to be attached to the individual levels of the shelves 12. Additionally, the detection radius of the additional antennas may need to be reduced. It should be understood that various storage and naming schemes may be used based on the particular storage facility or other common practice in the industry.

In any event, in use, the forklift operator may interact with the display screen 50 of the user interface device 23 (e.g., by touching, swiping, or pressing the display screen 50) to modify the location information of the product 13 stored in the product database 27. The type of modification and amount of modification allowable through the user interface device 23 may be tailored to suit the needs of the particular application of the RFID-based tracking system. In particular, the forklift operator may only be allowed to change the information stored when the system detects a drop-off event. Thus, by pressing the change location input 82 depicted in FIG. 17, the forklift operator would navigate to the display 28 shown in FIG. 18 and, for example, press an appropriate one of the arrows 52 for each field of the location information to modify the location information of the product 13 that is stored in the product database 27. After the forklift operator corrects the location information of the product 13 stored in the product database 27, the forklift operator may then interact with the display screen 50 to confirm the modification (e.g., press "submit") or may cancel the modification (e.g., press "cancel").

The user interface device 23 may, in addition to automatically receiving job requests from the asset tracking and management device 26, enable the forklift driver to manually select order requests that are stored on the centralized asset tracker and management device 26 to thereby implement these orders. In particular, the tracking application 36 records each order that needs to be implemented and may assign jobs or orders to forklift drivers as these drivers being their shift, finish an order, etc. FIGS. 19-27 illustrate examples of information that may be shown on the display screen 50Q, 50R, 50S, 50T, 50U, 50V, 50W, 50X, 60Y of the user interface device 23 to manage or implement various orders. Common elements between the figures are shown with common reference numerals.

In particular, FIG. 19 illustrates a summary of pending order information 74, which includes requested product transfers 74A, product transfers in transit 74B, products delivered 74C, customer identification 74D, amount of products available that satisfy a particular order 74E, a dock 74F, trailer truck information 74G, the driver of the truck 74H, a time-stamp of when the order was dispatched 74I, a time-stamp of when a forklift operator began to fulfill an order 74J, and a status of the order 74K, an order ID 76, a job complete input 78, an order details input 81, a create dispatch input 83, and a refresh input 85. In use, the forklift operator may interact with the display screen 50P of the user interface device 23 (e.g., by touching or pressing the display screen 50) to select order requests, find products, receive order details, and complete order requests. As shown in FIG. 19, the display screen 50Q of the user interface device 23 displays pending order information 74 to the forklift operator regarding outstanding or pending orders to be implemented. In particular, the display screen 50Q displays the requested product transfers 74A that are still outstanding for each particular order ID 76, the number of product transfers in transit 74B for a particular order ID 76, products delivered 74C for a particular order ID 76, when the job was dispatched for a particular order ID 76, and when the first forklift operator began to fulfill the job for a particular order ID 76. To ensure that the display screen 50P depicts accurate presentation of information to the forklift operator, the user interface device 23 may be updated in real time, i.e., the centralized asset tracker and management device 26 and the tracking application 36 send updated information to the user interface device 23 as changes to either the number of requested product transfers 74A, the number of product transfers in transit 74B, the number of products delivered 74C, or the number of available products 74E occurs. The forklift operator may interact with the screen 50P in a manner that improves employee efficiency. For example, by having real time information regarding the status of pending order implementations constantly available, the forklift operator may better choose which order implementation needs the most assistance if, for example, a particular order needs to be filled in a more pressing manner than other orders. Once the forklift operator navigates to the desired order to be filled (e.g., by touching or pressing the screen 50P), the operator then selects the order to be filled by, for example, touching or pressing the screen 50P. The displays 50C-50L of FIGS. 5-10, respectively, may then be used to display various information to the operator. For example, the screen 50D of FIG. 6 may be displayed when a product 13 has first been picked up and the screen 50E of FIG. 7 may be displayed when a product 13 has been delivered to the product destination 66. In particular, the display screen 50D of FIG. 6 may display the product information menu 72 in, for example, a green color to alert the forklift driver that they have chosen the correct product. The display screens 50E of FIG. 7 may display the product information menu 72 in, for example, a purple color to alert the forklift driver that he or she has transferred the product 13 to the correct destination (e.g., a trailer truck located at a loading bay 16) successfully.

Figure 21:
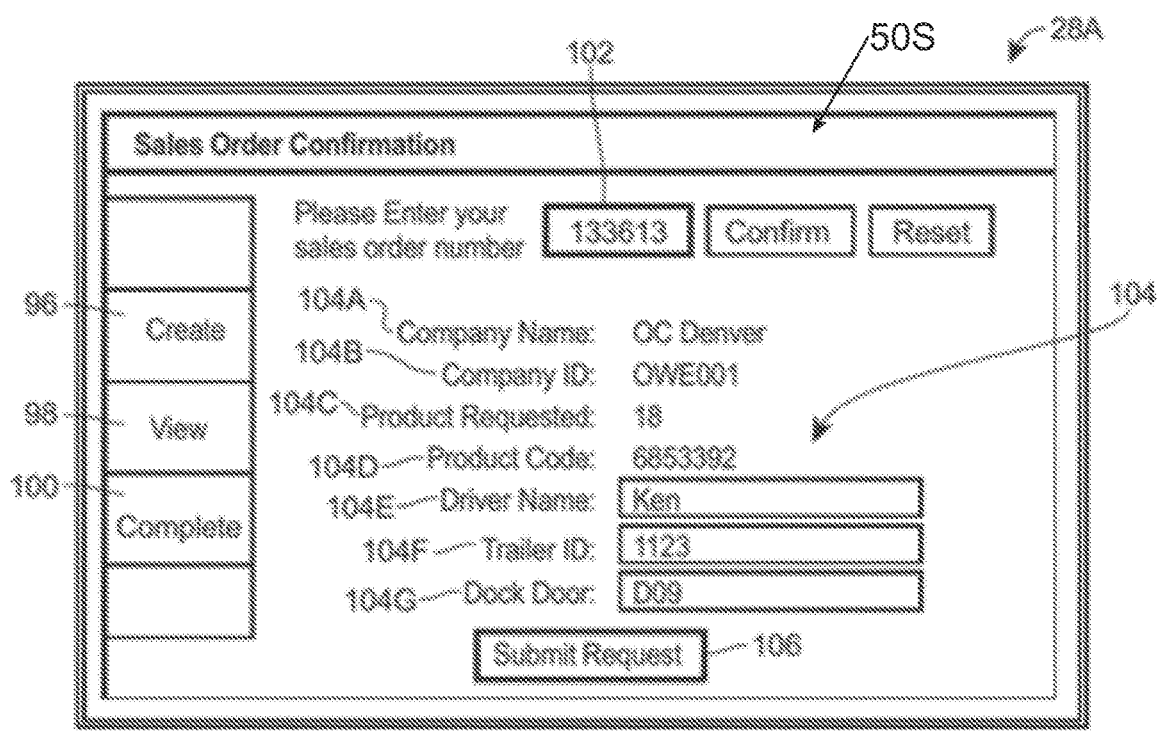
FIG. 21 is an example display screen of a user interface device used to enter or view delivery driver information.
Figure 22:
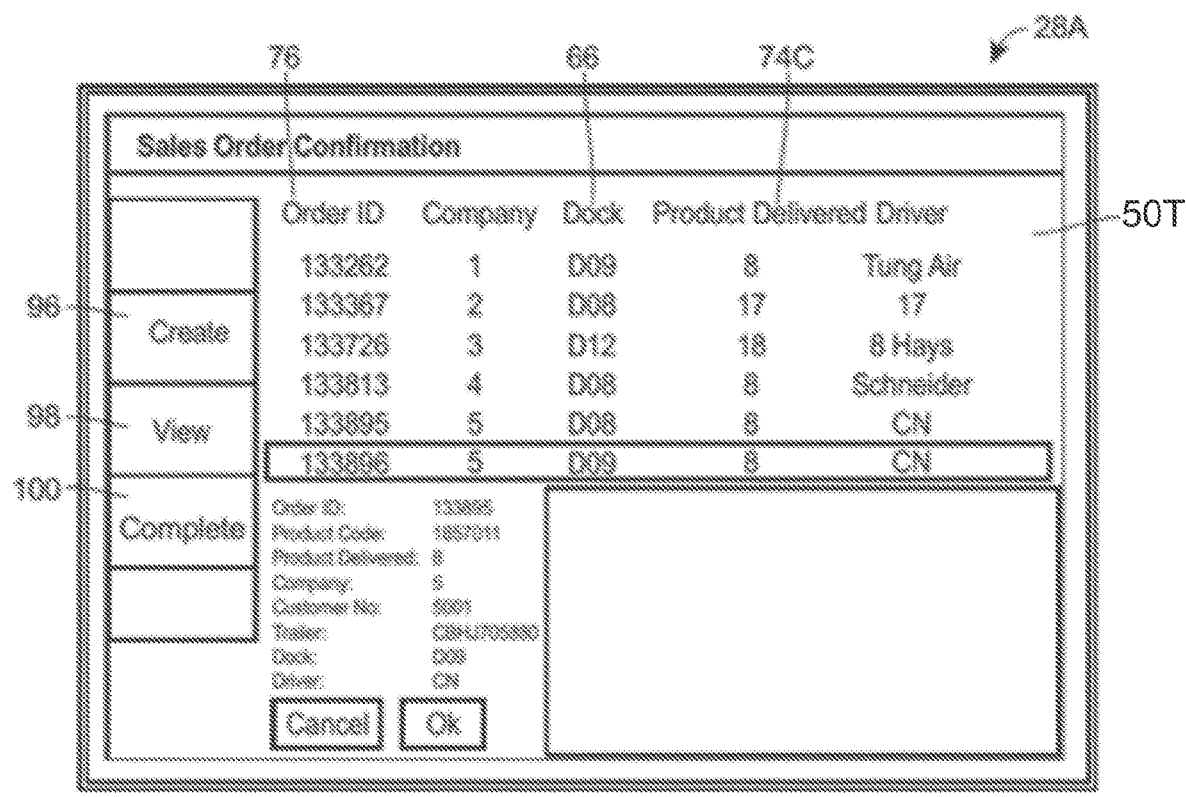
FIG. 22 is an example display screen of a user interface device of a general overview of outstanding orders.

The tracking application 36 may also be used directly by a shipping clerk or an inventory manager for a variety of reasons. In particular, the shipping clerk or inventory manager may use the tracking application 36 to, for example, query the product and order database 27 using a particular order number, to create a new order, to view an existing order, and/or to complete a pending order. The use of the tracking application 36 will be described in reference to FIGS. 20-22, which illustrate various display screens 50R, 50S, 50T that may be displayed on a user interface device 28A. In particular, FIG. 20 illustrates an order selection and input screen or menu which may be presented by the tracking application 36 to enable a user to select or locate an order by order number, for example. FIGS. 21 and 22 also illustrates a create new order input 96 (which when selected, causes the application 36 to enable a user to create a new order), a view order input 98 (which when selected, causes the application 36 to enable a user to view and/or change details of an existing order), a complete order input 100 ((which when selected, causes the application 36 to enable a user to manually close or indicate that an order is complete), and an order number input 102 (which indicates the order number for the order). FIG. 21 further illustrates a sales order overview information 104, which includes a company name 104A, a company ID 104B, a product count for a particular order 104C, a product code 104D, a driver name 104E, a trailer ID 104F, and a dock door location 104G. Common elements between the FIGS. 20-22 are depicted using common reference numerals. In use, the tracking application 36 may require the order number 76 (FIG. 19) to be input into the order number input 102, as shown in FIG. 19, which the tracking application 36 may then use to query the product and order database 27. Once the product and order database 27 locates the sales order overview information 104, the product and order database 27 then sends the sales order overview information 104 to the user interface device 28A (which may be an interface connected directly to the computer 26 or which may be connected to the computer 26 via a remote connection). The tracking application 36 may then display the sales overview information 104 on the display screen 50S as shown in FIG. 21. When the sales order overview information 104 is received by the user interface display 28A, some information may be missing and it may be necessary for the sales clerk or inventory manager to manually input that information via an input device, such as a keyboard, a touch screen device, etc. For example, the sales clerk or the inventory manager may input the driver name 104E, the trailer ID 104F, and the dock door 104G (i.e., loading bay 16) into the user interface device 28A as illustrated in FIG. 21. Once the information is input, the sales clerk or the inventory manager may then interact with the display 50 (e.g., by pressing, touching, or using a mouse to click the display 50) to store the new information into the product database 27. In particular, the user interface display 50S may send the driver name 104E, the trailer ID 104F, and the dock door 104G information to the product and order database 27 to be stored. The newly entered information may then be sent to the user interface device 23 of a forklift 18 and displayed on that particular display 23 to be viewed and used by a forklift operator. The newly entered information may also be displayed on the user interface display 50T of the user interface device 28A, as illustrated in FIG. 22. Additionally, the user interface device 50R and 50S of FIGS. 20 and 21, respectively, may allow for the creation of new sales order via section of the input 96, viewing of existing sales orders via the selection of the input 98, and the completion of a sales order via selection of the input 100 once all products for the order have been placed on the truck.

Figure 23:
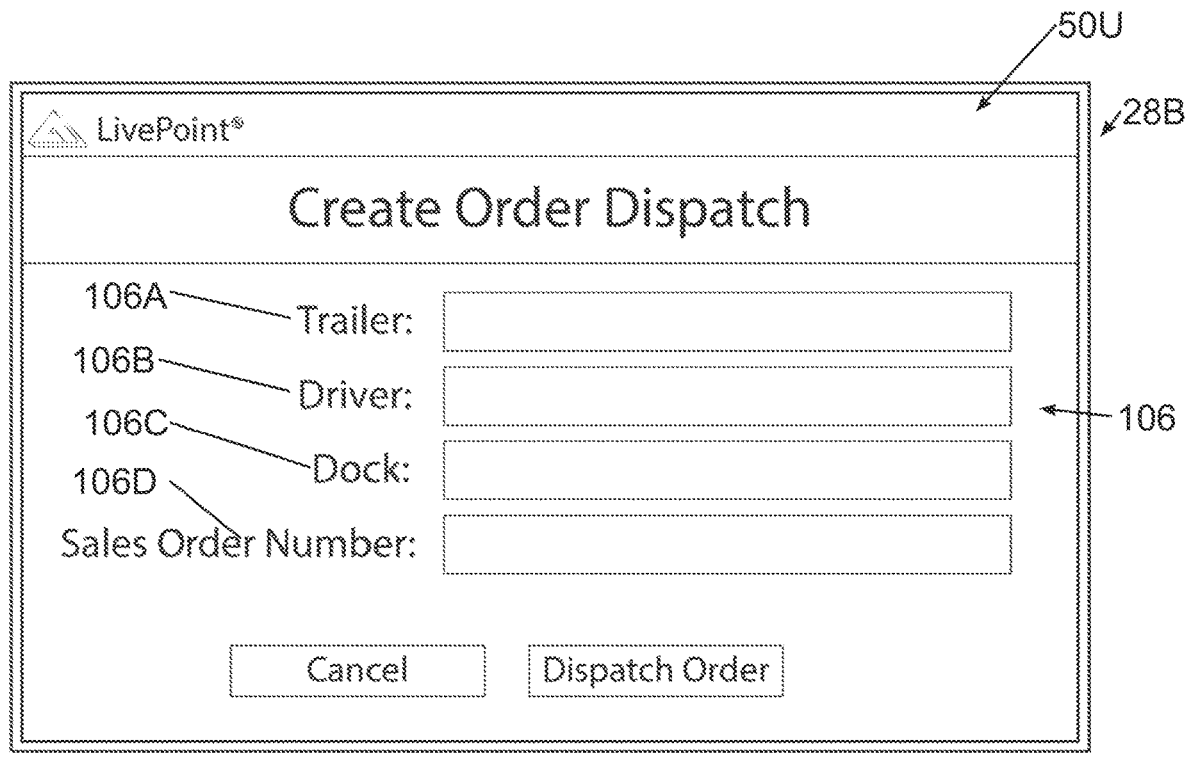
FIG. 23 is an example display screen of a user interface device that may be used to dispatch an order.
Figure 24:
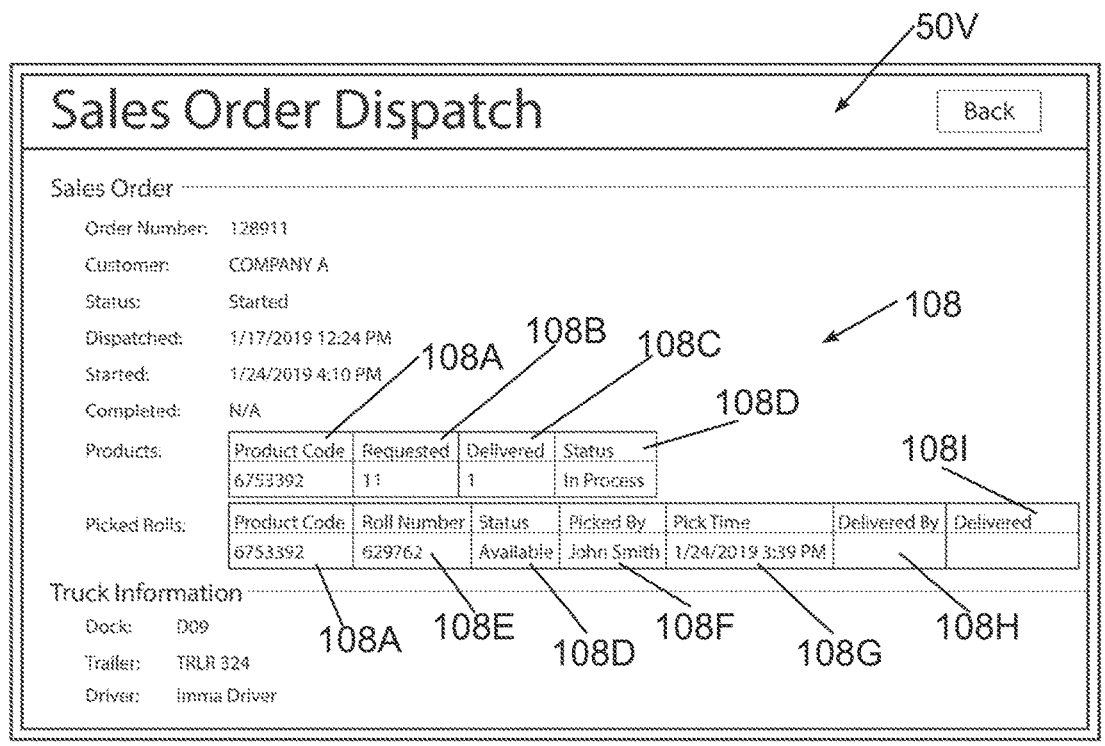
FIG. 24 is an example display screen of a user interface device that may be used to view the progress of an order being currently fulfilled.
Figure 25:
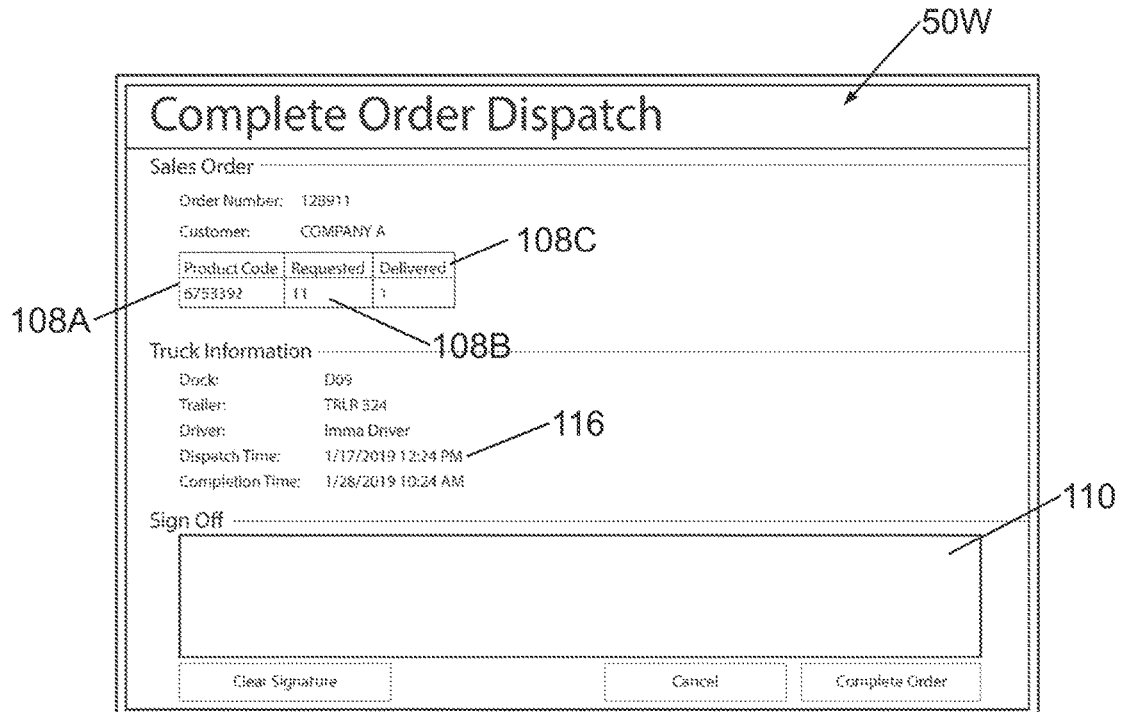
FIG. 25 is an example display screen of a user interface device that may be used to view and complete an order.
Figure 26:
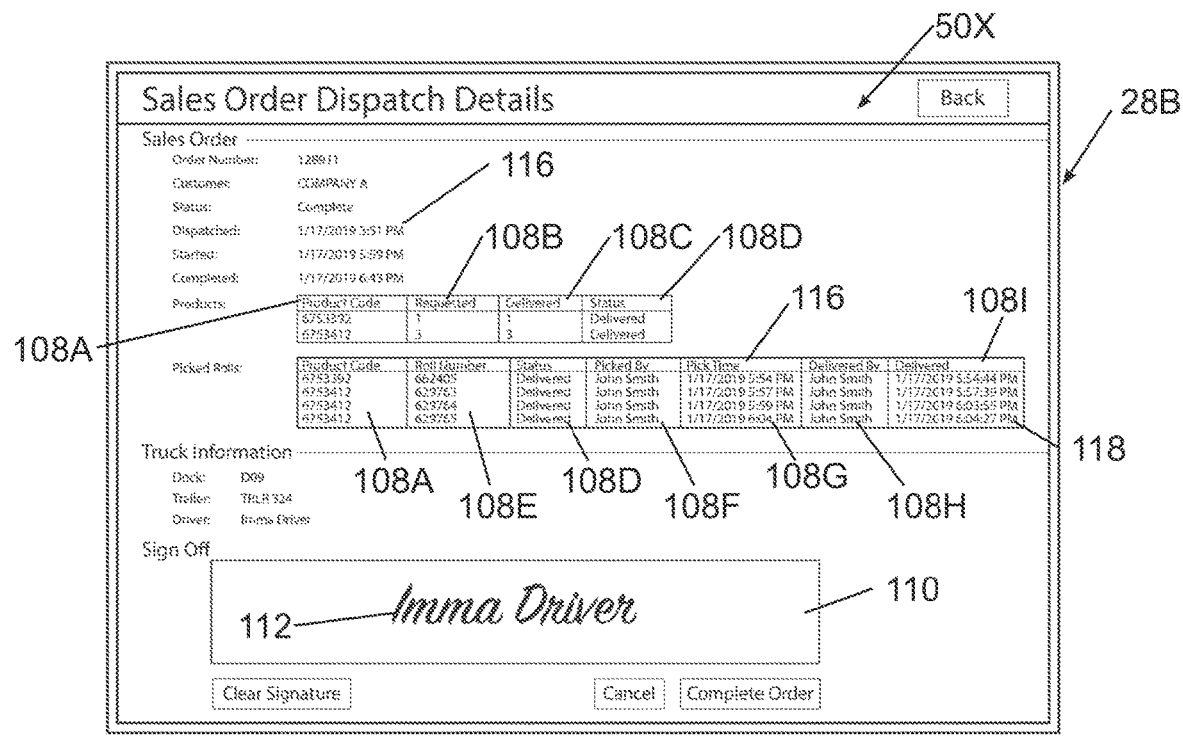
FIG. 26 is an example display screen of a user interface device that may be used to view and complete an order.
Figure 27:
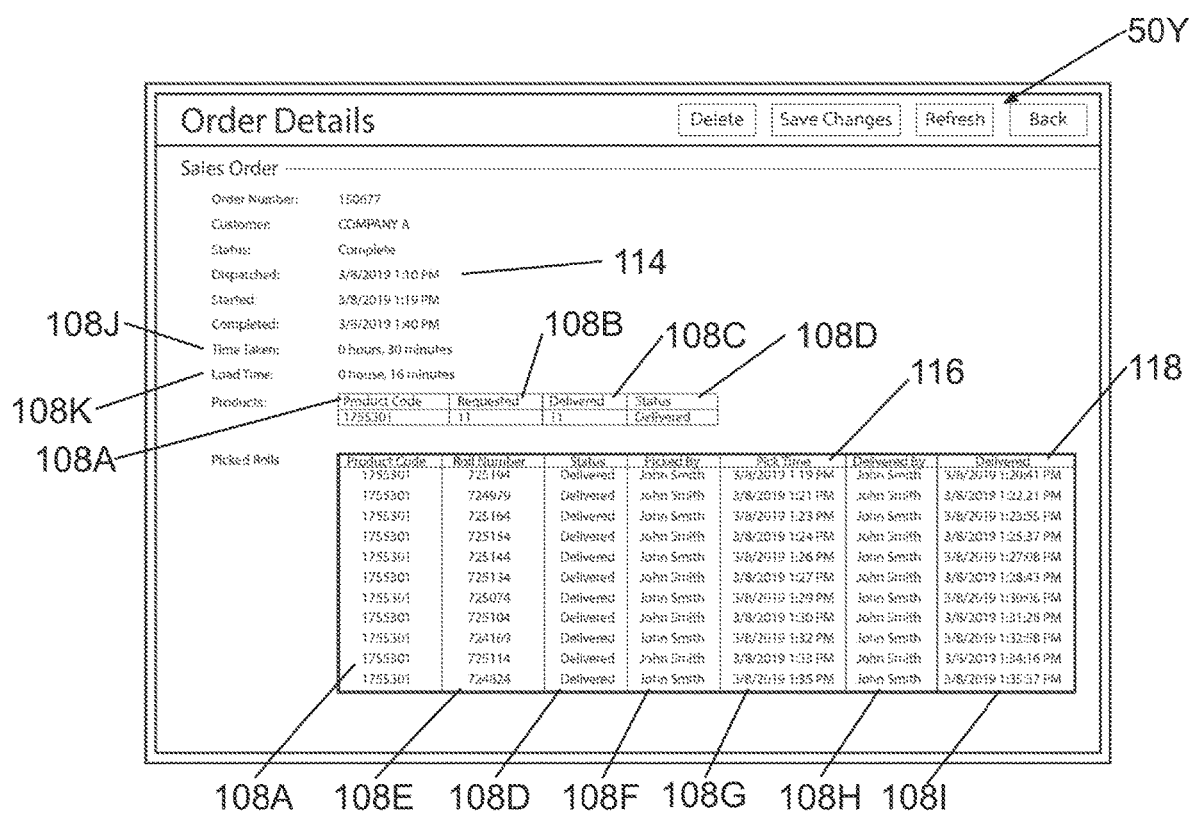
FIG. 27 is an example display screen of a user interface device that may be used to view an order that has been completed.

Moreover, a shipping clerk or an inventory manager may also directly use the tracking application 36 to dispatch an order once a trailer truck has arrived to accept a load of products 13. In particular, the shipping clerk of inventory manager may use the tracking application 36 to, for example, query the product and order database 27 to dispatch a new order to the forklift operators once a trailer truck is ready to be loaded. The use of the tracking application 36 will be described in reference to FIGS. 23-27, which illustrate various display screens 50U, 50V, 50W, 50X, and 50Y that may be displayed on a user interface device 28B. In particular, FIG. 23 illustrates an order dispatch screen or menu which may be displayed by the tracking application 36 to enable a user to dispatch an order once a truck is ready to be loaded with product. FIG. 24 illustrates real-time product information 108, which the tracking application 36 updates as products are delivered; FIG. 25 illustrates an example of a completed order; FIG. 26 illustrates another example of a complete order; and FIG. 27 illustrates an example detailed view of a completed order. FIG. 23 further illustrates order dispatch information 106 which includes a trailer ID 106A, a driver name 106B, a dock door location 106C, and a sales order number 106D. Common elements between the FIGS. 23-27 are depicted using common reference numerals. In use, once the user dispatches an order using the order dispatch information 106, the tracking application 36 may update order information for particular orders in real time by using the received product delivery information 108 from the user interface device 23 and the RFID reader 20 as products 13 are delivered to particular docks, or bays 16. As the tracking application 36 receives the product delivery information 108, the tracking application 36 may display the product delivery information 108 on the display screens 50V-50Y as shown in FIGS. 24-27. In particular, the product delivery information 108 received by the tracking application 36 from the user interface device 20, may include a product code 108A, an amount of product requested 108B, an amount of products actually delivered to the trailer 108C, a status 108D, a roll number 108E (as the product 13 in this example is a roll of material), the name of a forklift operator who picked the product 108F, a time the forklift operator picked the product 108G, the name of forklift operator who delivered the product 108H, and a time the forklift operator delivered the product 108I. It should be noted that the product deliver information 108A-108I is stored in the product and order database 27 of the tracking application 36. Additionally, FIGS. 25 and 26 depict a signature box 110 and FIG. 26 depicts a signature 112 of the truck driver in the signature box 110. In use, prior to the centralized asset tracking and management device 26 printing the final paperwork needed by the truck driver, the driver is required to digitally sign off, which indicates the order has been completed. In particular, the truck driver may digitally sign using a user interface device 23B in a shipping office and a writing utensil capable of interacting with the display screen 50 of the user interface device 23B (e.g., a pen, stylus, driver's finger, etc.). Once signed, the truck driver's signature 112 is stored in the product and order database 27, which may be later referenced by a shipping clerk or other user of the tracking application 36.

FIG. 27 further illustrates additional product delivery information 108 that includes a time taken to complete the order 108J and a time taken to load all the products on the trailer 108K. The tracking application 36 calculates the time taken to complete the order 108J on a processor of the centralized asset tracking and management device 26 by calculating the difference in time between when the order was first dispatched and when the forklift operator completed the order. In particular, when the tracking application 36 dispatches an order, a time-stamp 114 is associated with the particular dispatch and the time-stamp 114 is stored in the product and order database 27. Similarly, each time a product is picked up and subsequently dropped off, a pick up time-stamp 116 and a drop off time-stamp 118 are recorded and stored in the product and order database 27 by the tracking application 36. Thus, the tracking application 36 can calculate the difference between the dispatch time-stamp 114 and the final drop off time-stamp 118 to determine the total time taken to complete the order 108J. Similarly, the tracking application 36 can determine the amount of time taken to load all the products on the trailer 108J in a similar manner. In particular, the tracking application 36 can, for example, calculate the difference, using the processor of the centralized asset tracking and management device 26, between the first pick up time-stamp 116 and the final drop off time-stamp 118 to determine the time taken to load the products on the trailer 108J.

The invention claimed is:

1. An asset management and tracking system for use in a facility having a product designation radio frequency identification (RFID) tag attached to a product disposed within the facility and at least one location designation radio frequency identification (RFID) tag disposed within the facility, the product designation RFID tag indicating product information and the location designation RFID tag indicating location information, the system comprising:
   a radio frequency identification (RFID) reader configured to read at least one of the product designation RFID tag and the at least one location designation RFID tag, the RFID reader being carried by a movable device; and
   a portable communication device configured to receive product information from and transmit product information to an asset tracking and management device, the portable communication device being communicatively coupled to the RFID reader and carried by the movable device;
   wherein, the RFID reader is configured to transmit the product information read from the product designation RFID tag and the location information read from the location designation RFID tag to the portable communication device; and
   wherein, the portable communication device is configured to transmit the received product information and the received location information to the asset tracking and management device and configured to query the asset tracking and management device for additional product information and additional location information for the product.

2. The system of claim 1, wherein the portable communication device is configured to transmit the received product information after the RFID reader locks onto one product designation RFID tag.

3. The system of claim 1, further comprising a product detection device configured to detect a product disposed within a detection radius via a sensor.

4. The system of claim 1, further comprising at least one antenna disposed on the movable device, the at least one antenna configured to read and detect at least one of the product designation RFID tag and the at least one location designation RFID tag in response to a signal from the RFID reader.

5. The system of claim 4, wherein a first antenna of the at least one antenna is oriented in a first direction and a second antenna of the at least one antenna is oriented in a second direction.

6. The system of claim 1, further comprising a network communication device disposed proximate the product detection device and the RFID reader, the network communication device communicatively coupling the RFID reader to a wireless network.

7. The system of claim 6, wherein the portable communication device is communicatively coupled to the network communication device.

8. The system of claim 1, wherein the portable communication device is a user interface device.

9. The system of claim 1, wherein the portable communication device comprises:
a remote tracking and communication application stored on a memory of and executed on a processor of the portable communication device, the remote tracking application communicatively coupled to the RFID reader and the asset tracking and management device.

10. The system of claim 9, wherein the asset tracking and management device comprises:
a centralized tracking and management application stored on a memory of and executed on a processor of the asset tracking and management device, the centralized tracking and management application communicatively coupled to a wireless network disposed within the facility; and
a product and order database stored on the memory of the asset tracking and management device.

11. The system of claim 10, wherein the remote tracking and communication application queries the centralized tracking and management application via the wireless network and wherein the centralized tracking and management application queries the product and order database.

12. The system of claim 1, wherein the movable device is a product transportation vehicle.

13. The system of claim 12, wherein the product transportation vehicle is a forklift.

14. The system of claim 1, wherein the RFID reader is configured to read at least one of the product designation RFID tag and the at least one location designation RFID tag using at least one antenna.

15. The system of claim 1, wherein the RFID reader is releasably mounted to the movable device.

16. The system of claim 1, wherein the RFID reader is releasably mounted to the movable device via a magnet.

17. An asset management and tracking system for use in a facility, the system comprising:
a radio frequency identification (RFID) reader configured to read at least one radio frequency identification (RFID) tag, the RFID reader communicatively coupled to a set of antennas;
an asset tracking and management device, comprising:
a centralized tracking and management application stored on a memory of and executed on a processor of the asset tracking and management device; and
a product and order data base stored on the memory of the asset tracking and management device; and
a portable communication device configured to receive information from and transmit information to the asset tracking and management device, the portable communication device comprising:
a remote tracking and communication application stored on a memory of and executed on a processor of the portable communication device, the remote tracking application configured to communicate with the centralized tracking and management application and the RFID reader;
wherein, the remote tracking and communication application is further configured to query the centralized tracking and management application for product information and product location information; and
wherein, the centralized tracking and management application is further configured to query the product and order data based in response to the query from the remote tracking and communication application.

18. The system of claim 17, further comprising a product detection device configured to detect a product disposed within a detection radius of the product detection device.

19. The system of claim 18, wherein the RFID reader is configured to read the at least one a RFID tag in response to the product detection device detecting the product.

20. The system of claim 18, wherein the RFID reader activates at least one antenna in the set of antennas in response to the product detection device detecting the product.

21. The system of claim 18, wherein the RFID reader is configured to activate a product facing antenna of the set of antennas in response to the product detection device detecting the product.

22. The system of claim 17, wherein the set of antennas is disposed on a movable device, the set of antennas configured to read and detect the at least one RFID tag in response to a signal from the RFID reader.

23. The system of claim 17, wherein a first antenna of the set of antennas is oriented in a first direction and a second antenna of the set of antennas is oriented in a second direction different from the first direction.

24. The system of claim 17, wherein the at least one RFID tag includes a product designation RFID tag and at least one location designation RFID tag.

25. The system of claim 24, wherein the remote tracking application is configured to query the centralized application after the RFID reader locks onto one of the product designation RFID tag.

26. The system of claim 24, wherein the product designation RFID tag is disposed on the product.

27. The system of claim 24, wherein the location designation RFID tag is disposed at various locations within the storage facility.

28. The system of claim 17, further comprising a network communication device configured to communicate with at least one wireless node disposed within the facility, the network communication device communicatively coupling the RFID reader and a wireless network disposed within the facility.

29. The system of claim 17, wherein the product detection device, the RFID reader, and the wireless communication device are disposed on a movable device.

30. The system of claim 29, wherein the movable device is a product transportation vehicle.

31. The system of claim 30, where in the product transportation vehicle is a forklift.

32. A method of asset tracking and management in a facility having at least one radio frequency identification (RFID) tag disposed within the facility, the RFID tag having product information, the method comprising:
  acquiring a product disposed within the facility;
  reading, via a radio frequency identification (RFID) reader, the RFID tag disposed within the facility;
  transmitting, via the RFID reader, the read product information from the RFID tag to a portable communication device, the portable communication device configured to transmit product information to and receive product information from an asset tracking and management device;
  querying, via the portable communication device, the asset tracking and management device to receive stored product information, the stored product information being stored on a product and order database of the asset tracking and management device;
  comparing, via a processor of the asset tracking and management device, the read product information to the stored product information;
  generating, via the asset tracking and management device, a comparison signal and transmitting the comparison signal to the portable communication device, the comparison signal having at least one of product identification information and product destination information;
  displaying, via the portable communication device, the product identification information and the product destination information.

33. The method of claim 32, wherein reading the RFID tag disposed within the facility further comprises reading at least one of a product designation RFID tag and a location designation RFID tag.

34. The method of claim 33, wherein querying the asset tracking and management device further comprises querying the asset tracking and management device after the RFID reader locks onto one product designation RFID tag.

35. The method of claim 32, further comprising:
  detecting the acquired product, via a product detection device, the product detection device including a sensor configured to detect the product disposed within a detection radius;
  transmitting, via the product detection device, a detection signal to the RFID reader in response to detecting the product disposed within the detection radius.

36. The method of claim 35, further comprising activating at least one antenna, via the RFID reader, in response to receiving the detection signal.

37. The method of claim 32, wherein acquiring the product disposed within the facility further comprises acquiring the product disposed within the facility using a movable device.

38. The method of claim 37, wherein acquiring the product disposed within the facility using the movable device further comprising acquiring the product disposed within the facility using a product transportation vehicle.

39. The method of claim 38, wherein acquiring the product disposed within the facility using the product transportation vehicle further comprising acquiring the product disposed within the facility using a forklift.

40. A method of asset tracking and management in a facility having at least one radio frequency identification (RFID) tag and a product disposed within the facility, the method comprising:
  receiving, at a portable communication device, a request signal having product identification information, product location information, and product destination information;
  displaying, via the portable communication device, the product identification information, the product location information, and the product destination information;
  acquiring the product, via a movable device, in response to receiving the request signal;
  reading, via a radio frequency identification (RFID) reader, the RFID tag disposed on the product;
  transmitting, via the RFID reader, product information from the read RFID tag to the portable communication device, the portable communication device configured to receive product information from and transmit product information to an asset tracking and management device;
  querying, via the portable communication device, the asset tracking and management device to compare the read product information from the RFID tag to the product identification information sent in the request signal;
  displaying, via the portable communication device, a result of comparing the product information from the read RFID tag and the product identification information sent in the request signal.

41. The method of claim 40, further comprising:
generating, via the asset tracking and management device, the request signal; and
transmitting, via the asset tracking and management device, the request signal to the portable communication device.

42. The method of claim 40, further comprising:
detecting, via a product detection device, a pick up event when the product is acquired in response to the request signal, the product detection device including a sensor configured to detect the product.

43. The method of claim 40, further comprising:
transmitting, via the product detection device, a detection signal to the RFID reader in response to detecting the product.

44. The method of claim 43, wherein reading, via the RFID reader, the RFID tag disposed on the product further comprises reading, via the RFID reader, the RFID tag disposed on the product in response to receiving the detection signal from the product detection device.

45. The method of claim 40, wherein generating the request signal further comprises requesting the product information, the product location information, and the product destination information from a product and order database stored on a memory of the asset tracking and management device.

46. The method of claim 40, further comprising displaying an error message, via the portable communication device, when the read product information is different from the product information sent in the request signal.

* * * * *